United States Patent
Zheng et al.

(10) Patent No.: US 11,513,257 B2
(45) Date of Patent: Nov. 29, 2022

(54) WETTABLE SILICONE HYDROGEL CONTACT LENSES

(71) Applicant: Alcon Inc., Fribourg (CH)

(72) Inventors: Ying Zheng, Suwanee, GA (US); Jang-Shing Chiou, Suwanee, GA (US); Jinbo Dou, Johns Creek, GA (US); Yuan Chang, Atlanta, GA (US); Junhao Ge, Redwood City, CA (US); Steve Yun Zhang, Sugar Hill, GA (US); Li Yao, Duluth, GA (US); Karen Belinda Sentell, Alpharetta, GA (US); Ye Hong, Duluth, GA (US)

(73) Assignee: Alcon Inc., Fribourg (CH)

( * ) Notice: Subject to any disclaimer, the term of this patent is extended or adjusted under 35 U.S.C. 154(b) by 189 days.

(21) Appl. No.: 17/122,109

(22) Filed: Dec. 15, 2020

(65) Prior Publication Data
US 2021/0181379 A1    Jun. 17, 2021

Related U.S. Application Data

(60) Provisional application No. 62/948,490, filed on Dec. 16, 2019.

(51) Int. Cl.
*C08L 39/06* (2006.01)
*G02B 1/04* (2006.01)
(Continued)

(52) U.S. Cl.
CPC ............ *G02B 1/043* (2013.01); *B65B 25/008* (2013.01); *C08L 39/06* (2013.01); *C08L 71/02* (2013.01);
(Continued)

(58) Field of Classification Search
None
See application file for complete search history.

(56) References Cited

U.S. PATENT DOCUMENTS

| | | |
|---|---|---|
| 3,408,429 A | 10/1968 | Wichterle |
| 4,136,250 A | 1/1979 | Mueller |

(Continued)

FOREIGN PATENT DOCUMENTS

| | | |
|---|---|---|
| AU | 2013200591 A1 | 2/2013 |
| EP | 0632329 A1 | 1/1995 |

OTHER PUBLICATIONS

Subhash C. Shit and Sukumar Maiti, "Application of NMR Spectroscopy in Molecular Weight Determination of Polymers", Eur. Polym. J. vol. 22, No. 12, pp. 1001-1008, 1986.
(Continued)

*Primary Examiner* — Peter A Salamon
(74) *Attorney, Agent, or Firm* — Jian Zhou

(57) ABSTRACT

The invention relates to an ophthalmic product which comprises a sealed and autoclave-sterilized lens package including (1) a post-autoclave packaging solution containing a polymeric surfactant having an HLB value of from about 11 to about 16 and a Mn of from about 800 to about 20,000 Daltons and (2) a readily-usable silicone hydrogel (SiHy) contact lens immersed in the packaging solution. The readily-usable SiHy contact lens comprises the polymeric surfactant thereon providing an excellent wettability to the readily-usable SiHy contact lens directly out of the lens package, and also the leachable polymeric surfactant which is physically distributed in the polymer matrix of the SiHy contact lens and can be released to the eye of a patient for at least 7 days of daily wear and to replenish the lens surface-bound polymeric surfactant to provide sustainable wettabilities to the contact lens and the eye.

23 Claims, 4 Drawing Sheets

(51) Int. Cl.
  *B65B 25/00* (2006.01)
  *C08L 71/02* (2006.01)
  *C08L 83/04* (2006.01)
  *G02C 7/04* (2006.01)

(52) U.S. Cl.
  CPC ............... *C08L 83/04* (2013.01); *G02C 7/04* (2013.01); *B65D 2585/545* (2013.01)

(56) References Cited

U.S. PATENT DOCUMENTS

| | | |
|---|---|---|
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek et al. |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyohima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono et al. |
| 5,070,170 A | 12/1991 | Robertson et al. |
| 5,070,215 A | 12/1991 | Bambury |
| 5,079,319 A | 1/1992 | Mueller |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai |
| 5,508,317 A | 4/1996 | Müller |
| 5,583,163 A | 12/1996 | Müller |
| 5,760,100 A | 6/1998 | Nicolson et al. |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,099,122 A | 8/2000 | Chabrecek et al. |
| 6,166,236 A | 12/2000 | Bambury |
| 6,367,929 B1 | 4/2002 | Maiden et al. |
| 6,436,481 B1 | 8/2002 | Chabrecek et al. |
| 6,440,571 B1 | 8/2002 | Valint, Jr. et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,500,481 B1 | 12/2002 | Vanderlaan et al. |
| 6,521,352 B1 | 2/2003 | Chabrecek et al. |
| 6,586,038 B1 | 7/2003 | Chabrecek et al. |
| 6,623,747 B1 | 9/2003 | Chatelier et al. |
| 6,627,124 B1 | 9/2003 | Herbrechtsmeier et al. |
| 6,719,929 B2 | 4/2004 | Winterton et al. |
| 6,730,366 B2 | 5/2004 | Lohmann et al. |
| 6,734,321 B2 | 5/2004 | Chabracek et al. |
| 6,762,264 B2 | 7/2004 | Kuenzler et al. |
| 6,793,973 B2 | 9/2004 | Winterton et al. |
| 6,800,225 B1 | 10/2004 | Hagmann et al. |
| 6,822,016 B2 | 11/2004 | McCabe et al. |
| 6,835,410 B2 | 12/2004 | Chabrecek et al. |
| 6,867,245 B2 | 3/2005 | Iwata et al. |
| 6,878,399 B2 | 4/2005 | Chabrecek et al. |
| 6,884,457 B2 | 4/2005 | Gilliard et al. |
| 6,896,926 B2 | 5/2005 | Qiu et al. |
| 6,923,978 B2 | 8/2005 | Chatelier et al. |
| 6,926,965 B2 | 8/2005 | Qiu et al. |
| 6,940,580 B2 | 9/2005 | Winterton et al. |
| 7,052,131 B2 | 5/2006 | McCabe et al. |
| 7,214,809 B2 | 5/2007 | Zanini et al. |
| 7,249,848 B2 | 7/2007 | Laredo et al. |
| 7,268,198 B2 | 9/2007 | Kunzler |
| 7,297,725 B2 | 11/2007 | Winterton et al. |
| 7,384,590 B2 | 6/2008 | Kelly et al. |
| 7,387,759 B2 | 6/2008 | Kelly et al. |
| 7,423,074 B2 | 9/2008 | Lai |
| 7,540,609 B2 | 6/2009 | Chen |
| 7,572,841 B2 | 8/2009 | Chen |
| 7,605,190 B2 | 10/2009 | Moszner et al. |
| 7,750,079 B2 | 7/2010 | Almond |
| 7,858,000 B2 | 12/2010 | Winterton |
| 7,934,830 B2 | 5/2011 | Blackwell |
| 8,044,112 B2 | 10/2011 | Matsuzawa |
| 8,142,835 B2 | 3/2012 | Mueller et al. |
| 8,147,897 B2 | 4/2012 | Ferreiro et al. |
| 8,158,192 B2 | 4/2012 | Bothe et al. |
| 8,231,218 B2 | 7/2012 | Hong |
| 8,318,144 B2 * | 11/2012 | Ketelson ............... A45C 11/005 424/78.04 |
| 8,367,746 B2 | 2/2013 | Manesis et al. |
| 8,409,599 B2 | 4/2013 | Wu |
| 8,415,405 B2 | 4/2013 | Maggio |
| 8,445,614 B2 | 5/2013 | Francis |
| 8,475,529 B2 | 7/2013 | Clarke |
| 8,480,227 B2 | 7/2013 | Qiu |
| 8,481,662 B2 | 7/2013 | Liu |
| 8,487,058 B2 | 7/2013 | Liu |
| 8,513,325 B2 | 8/2013 | Liu |
| 8,529,057 B2 | 9/2013 | Qiu |
| 8,614,261 B2 | 12/2013 | Iwata et al. |
| 8,658,748 B2 | 2/2014 | Liu et al. |
| 8,703,891 B2 | 4/2014 | Broad |
| 8,820,928 B2 | 9/2014 | Back |
| 8,835,525 B2 | 9/2014 | Kuyu |
| 8,865,789 B2 | 10/2014 | Yao |
| 8,937,110 B2 | 1/2015 | Alli et al. |
| 8,937,111 B2 | 1/2015 | Alli et al. |
| 8,939,577 B2 | 1/2015 | Qiu et al. |
| 8,944,592 B2 | 2/2015 | Qiu et al. |
| 8,993,651 B2 | 3/2015 | Chang |
| 9,057,821 B2 | 6/2015 | Broad |
| 9,057,822 B2 | 6/2015 | Liu |
| 9,097,840 B2 | 8/2015 | Chang et al. |
| 9,103,965 B2 | 8/2015 | Chang |
| 9,121,998 B2 | 9/2015 | Chen |
| 9,125,808 B2 | 9/2015 | Alli et al. |
| 9,140,825 B2 | 9/2015 | Alli et al. |
| 9,140,908 B2 | 9/2015 | Ge |
| 9,156,934 B2 | 10/2015 | Alli et al. |
| 9,164,298 B2 | 10/2015 | Hong |
| 9,170,349 B2 | 10/2015 | Mahadevan |
| 9,188,702 B2 | 11/2015 | Vanderlaan |
| 9,217,813 B2 | 12/2015 | Liu |
| 9,239,409 B2 | 1/2016 | Qiu et al. |
| 9,244,200 B2 | 1/2016 | Qiu et al. |
| 9,296,159 B2 | 3/2016 | Zheng |
| 9,322,959 B2 | 4/2016 | Ueyama et al. |
| 9,322,960 B2 | 4/2016 | Broad et al. |
| 9,360,594 B2 | 6/2016 | Liu |
| 9,411,171 B2 | 8/2016 | Qiu et al. |
| 9,475,827 B2 | 10/2016 | Chang et al. |
| 9,505,184 B2 | 11/2016 | Kolluru et al. |
| 9,507,173 B2 | 11/2016 | Qiu et al. |
| 9,529,119 B2 | 12/2016 | Imafuku |
| 9,738,813 B2 | 8/2017 | Qiu et al. |

(56) References Cited

U.S. PATENT DOCUMENTS

| | | | |
|---|---|---|---|
| 9,816,009 | B2 | 11/2017 | Qiu et al. |
| 9,829,723 | B2 | 11/2017 | Muya et al. |
| 10,081,697 | B2 | 9/2018 | Huang et al. |
| 10,131,815 | B2 | 11/2018 | Qiu et al. |
| 10,222,509 | B2 | 3/2019 | Kolluru et al. |
| 10,301,451 | B2 | 5/2019 | Jing et al. |
| 10,308,835 | B2 | 6/2019 | Qiu et al. |
| 2007/0122540 | A1 | 5/2007 | Salamone |
| 2008/0142038 | A1 | 6/2008 | Kunzler |
| 2009/0145086 | A1 | 6/2009 | Reynolds |
| 2009/0145091 | A1 | 6/2009 | Connolly |
| 2011/0134387 | A1 | 6/2011 | Samuel |
| 2012/0026457 | A1 | 2/2012 | Qiu |
| 2013/0118127 | A1 | 5/2013 | Kolluru et al. |
| 2017/0160565 | A1* | 6/2017 | Muya .............. G02C 7/049 |
| 2018/0100038 | A1 | 4/2018 | Jing et al. |
| 2018/0105620 | A1* | 4/2018 | Chang .............. G02B 1/043 |
| 2018/0355112 | A1 | 12/2018 | Zhang et al. |
| 2018/0356562 | A1 | 12/2018 | Wu et al. |
| 2019/0055427 | A1 | 2/2019 | Qiu et al. |
| 2019/0179055 | A1 | 6/2019 | Qiu et al. |
| 2019/0309188 | A1 | 10/2019 | Qiu et al. |

OTHER PUBLICATIONS

Edward G. Brame, Raymond C. Ferguson, George .J. Thomas, Jr., "Identification of Polyurethanes by High Resolution Nuclear Magnetic Resonance Spectrometry", Analytical Chemistry, vol. 39, No. 4, 1967, pp. 517-521.

F. W. Yeager & J.W. Becker, "Determination of Composition and Molecular Weight of Polyester Urethanes by High Resolution Proton Magnetic Resonance Spectrometry", Analytical Chemistry, 1977, vol. 49, No. 6, pp. 722-724.

G.B. Shah, "Characterisation of silicone prepolymers and disparity in results", EXPRESS Polymer Letters, vol. 2, No. 11, 2008, pp. 829-834.

Heideman, Greivenkamp, "Low-coherence interferometer for contact lens surface metrology", Optical Engineering, 55(3), 034106, Mar. 2016, pp. 1-12.

Josephat U. Izunobi and Clement L. Higginbotham, "Polymer Molecular Weight Analysis by 1H NMR Spectroscopy", Journal of Chemical Education, ACS Publications, 2011, 88, pp. 1098-1104.

Katherine Paulsen & Daniel Frasco, "Determination of Polymer Molecular Weight and Composition Using picoSpin NMR Spectroscopy", ThermoFisher Scientific, Application Note No. AN52907, 2016.

Kang-Jen Liu, "NMR Studies of Polymer Solutions, VI. Molecular Weight Determination of Poly(ethylene glycol) by NMR Analysis of Near-end Groups", Makromol. Chem., 1968, 116, pp. 146-151.

Kang-Jen Liu, "Nuclear Magnetic Resonance Studies of Polymer Solutions. IV. Polyethylene Glycols", Macromolecules, Polymer Solutions, vol. 1, No. 3, 1968, pp. 213-217.

S. Mishima et al., "Determination of Tear Volume and Tear Flow", Investigative Ophthalmology, Jun. 1966, vol. 5, No. 3, pp. 264-276.

Otto Schirmer, "Studies on the Physiology and Pathology of Tear Secretion and Drainage", Graefe's Archiv fur Ophthalmologie 1903, 56, LVI, 2, pp. 197-291 (Machine Translation).

Terence Cosgrove et al., "Impact of End-Tethered Polyhedral Nanoparticles on the Mobility of Poly (dimethylsiloxane)", American Chemical Society, Langmuir, 2015, 31, pp. 8469-8477.

Thomas F. Page, Jr., & Warren E. Bresler, "End-Group Analysis and Number-Average Molecular Weight Determination of Some Polyalkylene Glycols and Glycol Polyesters Using Nuclear Magnetic Resonance Spectroscopy", Analytical Chemistry, Sep. 1964, vol. 36, No. 10, pp. 1981-1985.

* cited by examiner

WETTABLE SILICONE HYDROGEL CONTACT LENSES

This application claims the benefit under 35 USC § 119 (e) of U.S. provisional application No. 62/948,490 filed 16 Dec. 2019, incorporated by reference in its entirety.

The present invention generally relates to silicone hydrogel contact lenses having enhanced and lasting wettabilities and to a method for producing the same.

BACKGROUND

Silicone hydrogel (SiHy) contact lenses, which are made of a hydrated, crosslinked polymeric material that contains silicone and a certain amount of water within the lens polymer matrix at equilibrium, are increasingly becoming popular, because they have minimal adverse effects on corneal health due to their high oxygen permeability. However, incorporation of silicone in a contact lens material can have undesirable effects on the hydrophilicity and wettability of SiHy contact lenses, because silicone is hydrophobic and has a great tendency to migrate onto the lens surface being exposed to air. Contact lenses manufacturers have made a great effort in developing SiHy contact lenses having a hydrophilic and wettable surface.

One class of approaches for modifying the hydrophilicity and wettability of a SiHy contact lens are to subject a SiHy contact lens to a post-molding surface treatment. Examples of post-molding surface treatments include: plasma treatment (see, e.g., commercial lenses, Alcon's AIR OPTIX®, Menicon's PremiO™, and Bausch & Lomb's PUREVISION™); covalent attachment of hydrophilic polymers onto the SiHy contact lens according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Pat. Appl. Pub. Nos. 2009/0145086 A1, 2009/0145091A1, 2008/0142038A1, and 2007/0122540A1); a layer-by-layer (LbL) polyionic material deposition technique (see, e.g., U.S. Pat. Nos. 6,451,871, 6,719,929, 6,793,973, 6,884,457, 6,896,926, 6,926,965, 6,940,580, 7,297,725, 8,044,112, 7,858,000, and 8,158,192); crosslinking of LbL coatings on SiHy contact lenses (see, e.g., U.S. Pat. Nos. 8,147,897 and 8,142,835); applying of a non-silicone hydrogel coating onto a SiHy contact lens (see, e.g., U.S. Pat. Nos. 8,480,227, 8,529,057, 8,939,577, 8,944,592, 9,239,409, 9,244,200, 9,411,171, 9,505,184, 9,507,173, 9,738,813, 9,816,009, 10,131,815, 1,022,509, and 10,308,835; and U.S. Pat. Appl. Pub. No. 2019-0055427, 2019-0179055, and 2019-0309188).

One different approach is the incorporation of monomeric wetting agents (e.g., N-vinylpyrrolidone, N-vinyl-N-methyl acetamide, or the like) or high molecular weight hydrophilic polymer(s) (e.g., polyvinylpyrrolidone with Mw≥100,000 Daltons for forming interpentrating networks) in a lens formulation for making naturally-wettable SiHy contact lens (i.e., wettable SiHy lenses without post-molding surface treatment) as proposed in U.S. Pat. Nos. 6,867,245, 7,268,198, 7,540,609, 7,572,841, 7,750,079, 7,934,830, 8,231,218, 8,367,746, 8,445,614, 8,481,662, 8,487,058, 8,513,325, 8,703,891, 8,820,928, 8,865,789, 8,937,110, 8,937,111, 9,057,821, 9,057,822, 9,121,998, 9,125,808, 9,140,825, 9,140,908, 9,156,934, 9,164,298, 9,170,349, 9,188,702, 9,217,813, 9,296,159, 9,322,959, 9,322,960, 9,360,594, 9,529,119, 6,367,929, 6,822,016, 7,052,131, and 7,249,848 and in U.S. Pat. Appl. Pub. Nos. (see, e.g., 2018-0355112 and 2018-0356562). Commercial SiHy contact lenses, such as, Biofinity® (CooperVision, Dk=128 barrers, 48% $H_2O$), Avaira® (CooperVision, Dk=100 barrers, 46% $H_2O$), Clariti® (CooperVision, Dk=60 barrers, 56% $H_2O$), MyDay® (CooperVision, Dk=80 barrers, 54% $H_2O$), ULTRA™ (Bausch & Lomb, Dk=114 barrers, 46% $H_2O$), Acuvue® Oasys® (Johnson & Johnson, Dk~105 Barrers, 38% $H_2O$); Acuvue® Advance® (Johnson & Johnson, Dk-65 Barrers, 47% $H_2O$); Acuvue® TruEye™ (Johnson & Johnson, Dk-100 Barrers, 46% $H_2O$); may utilize this approach in their production processes. Although this approach might be used in the commercial SiHy lens production to provide fresh (unused) SiHy lenses with adequately hydrophilic surfaces, there are some limitations: such as, for example, slightly-high haziness due to the incompatibility of polymerizable silicone components with monomeric wetting agents and other hydrophilic components; higher surface silicone contents; susceptibility to form dry spots and/or hydrophobic surface areas created due to air exposure, dehydrating-rehydrating cycles, shearing forces of the eyelids, silicone migration to the surface, and/or partial failure to prevent silicone from exposure; and not-adequate lubricity.

U.S. Pat. No. 9,829,723 discloses improved contact lens products each of which comprises a plasma-coated silicone hydrogel contact lens immersed and autoclaved in a packaging solution including a polyoxyethylene-polyoxybutylene block copolymer and a high molecular weight copolymer of N-vinylpyrrolidone and at least one amino-containing vinylic monomer. According to this patent, during the autoclaving of a plasma-coated silicone hydrogel contact lens immersed in a buffered saline containing a copolymer of N-vinylpyrrolidone and an amino-containing vinylic monomer and a polyoxyethylene-polyoxybutylene block copolymer at a relatively-high concentration (e.g., 400 ppm used in the working examples), a relatively-stable film can be formed on the plasma-coated silicone hydrogel contact lens so as to provide an improved and sustainable wettability the resultant plasma-coated silicone hydrogel contact lens.

Therefore, there is a need for coating-free silicone hydrogel contact lenses with enhanced and lasting surface wettabilities and with a suitability for being worn continuously for 7 days and for a method for making such silicone hydrogel contact lenses in an efficient manner.

SUMMARY OF THE INVENTION

The present invention, in one aspect, provides an ophthalmic product comprising a sealed and autoclave-sterilized package which includes a post-autoclave packaging solution and a readily-usable silicone hydrogel contact lens immersed therein, wherein the post-autoclave packaging solution is a buffered saline having a pH of from about 6.0 to about 8.0 and comprises a polymeric surfactant, wherein the polymeric surfactant comprises at least one hydrophilic poly(oxyethylene) segment and at least one hydrophobic poly(oxybutylene) segment and has an HLB (hydrophilic-lipophilic balance) value of from about 11 to about 16 and a number average molecular weight of from about 800 to about 20,000 Daltons, wherein the readily-usable silicone hydrogel contact lens is obtained by placing, sealing and autoclaving a pre-formed silicone hydrogel contact lens in a pre-autoclave packaging solution including the polymeric surfactant in a package, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 μg/lens/24 hours as measured in an aqueous extraction process consisting of 7 cycles of simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction, wherein the readily-usable silicone hydrogel contact lens further has a first static water contact angle, $WCA_{OOP}$, of about 75° or less as measured directly out of the sealed package by sessile drop method, a second static water contact angle, $WCA_{7\_S1DW}$, of about 85° or less as measured by sessile drop method immediately after being subjected to the 7 cycles of the simulated 1-day-wearing extraction, an oxygen permeability of at least 50 barrers, an elastic modulus of from about 0.2 MPa to about 1.5 MPa, and an equilibrium water content of from about 38% to about 80% by weight.

The present invention, in another aspect, provides a method for producing an ophthalmic product. The method of the invention comprises the steps of: a) placing and sealing a pre-formed silicone hydrogel contact lens in a container containing a pre-autoclave packaging solution to form a sealed package, wherein the pre-formed silicone hydrogel contact lens is free of any coating and has an oxygen permeability of at least 50 barrers, an elastic modulus of from about 0.2 MPa to about 1.5 MPa, and an equilibrium water content of from about 38% to about 80% by weight, wherein the pre-autoclave packaging solution is a buffered saline having a pH of from about 6.0 to about 8.0 and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons; and b) autoclaving the sealed package containing the pre-formed silicone hydrogel contact lens therein for at least about 30 minutes to obtain the ophthalmic product, wherein the ophthalmic product comprises a readily-usable silicone hydrogel contact lens in the sealed and autoclaved package, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 μg/lens/24 hours as measured in an aqueous extraction process consisting of 7 cycles of simulated 1-day-wearing extraction, a first static water contact angle, $WCA_{OOP}$, of about 75° or less as measured directly out of the sealed package by sessile drop method, and a second static water contact angle, $WCA_{7\_S1DW}$, of about 85° or less as measured by sessile drop method immediately after being subjected to the 7 cycles of the simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction.

These and other aspects of the invention will become apparent from the following description of the presently preferred embodiments. The detailed description is merely illustrative of the invention and does not limit the scope of the invention, which is defined by the appended claims and equivalents thereof.

DETAILED DESCRIPTION OF EMBODIMENTS OF THE INVENTION

Figure 1:
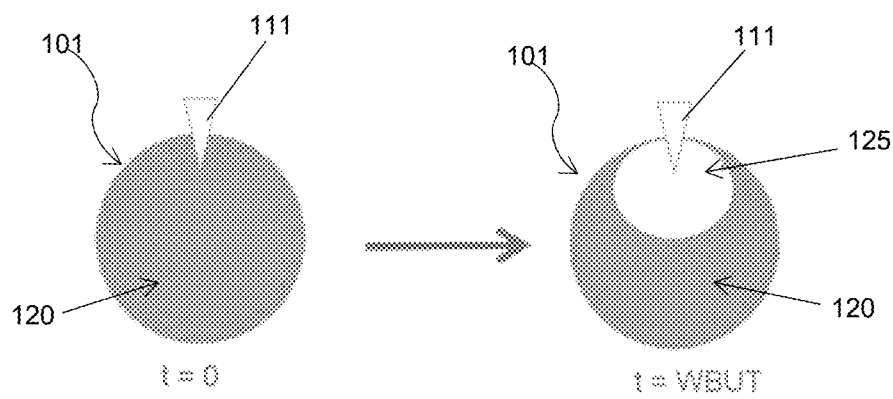
FIG. 1 schematically shows how to measure water-breakup time of a contact lens.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In this application, the abbreviation "SiHy" means silicone hydrogel; the abbreviation "EO" means oxyethylene —$C_2H_4O$—; the abbreviation "BO" means oxybutylene —$C_4H_8O$—; the abbreviations "PEO", "PBO" and "PEO" mean poly(oxyethylene), poly(oxybutylene), and poly(oxyethylene) respectively; the abbreviation "PEG" means polyethylene glycol.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

A "soft contact lens" refers to a contact lens that has an elastic modulus (i.e., Young's modulus) of less than 2.5 MPa.

A "hydrogel" or "hydrogel material" refers to a cross-linked polymeric material that has three-dimensional polymer networks (i.e., polymer matrix), is insoluble in water, but can hold at least 10 percent by weight of water in its polymer matrix when it is fully hydrated.

As used in this application, the term "silicone hydrogel" or "SiHy" interchangeably refers to a hydrogel containing silicone. A silicone hydrogel (SiHy) typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "non-silicone hydrogel" or "non-SiHy" interchageably refers to a hydrogel that is theoretically free of silicon.

A siloxane, which often also described as a silicone, refers to a moiety of —Si—O—Si— or a molecule having at least one moiety of —Si—O—Si—, where each Si atom carries two organic groups as substituents.

As used in this application, a "readily-usable SiHy contact lens" refers to a fully hydrated and autoclave-sterilized SiHy contact lens which can be directly used by a patient.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

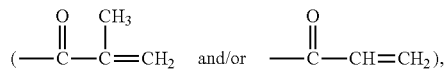

allyl, vinyl, styrenyl, or other C=C containing groups.

The term "terminal (meth)acryloyl group" refers to one (meth)acryloyl group at one of the two ends of the main chain (or backbone) of an organic compound as known to a person skilled in the art.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "blending vinylic monomer" refers to a vinylic monomer capable of dissolving both hydrophilic and hydrophobic components of a polymerizable composition to form a solution.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer that contains ethylenically unsaturated groups and has a number average molecular weight of greater than 700 Daltons.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

A "polysiloxane segment" refers to a polymer chain consisting of at least three consecutively- and directly-linked siloxane units (divalent radical) each independent of one another having a formula of

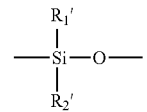

in which $R_1'$ and $R_2'$ are two substituents independently selected from the group consisting of $C_1$-$C_{10}$ alkyl, $C_1$-$C_4$ alkyl- or $C_1$-$C_4$— alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{\gamma 1}$—OR° (in which alk is $C_1$-$C_6$ alkyl diradical, R° is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3'$R$_4'$, amino linkages of —NR$_3'$—, amide linkages of —CONR$_3'$—, amide of —CONR$_3'$R$_4'$, urethane linkages of —OCONH—, and $C_1$-$C_4$ alkoxy group, or a linear hydrophilic polymer chain, in which R$_3'$ and R$_4'$ independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain that includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which are linked by one divalent radical.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

As used in this application, the term "phosphorylcholine" refers to a zwitterionic group of

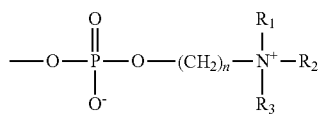

in which n is an integer of 1 to 5 and $R_1$, $R_2$ and $R_3$ independently of each other are $C_1$-$C_8$ alkyl or $C_1$-$C_8$ hydroxyalkyl.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in ISO 18369-4. Oxygen permeability is conventionally expressed in units of barrers, where "barrer" is defined as [($cm^3$ oxygen)(cm)/($cm^2$)(sec)(mm Hg)]×$10^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [($cm^3$ oxygen)/($cm^2$)(sec)(mm Hg)]×$10^{-9}$.

"Ophthalmically compatible", as used herein, refers to a material or surface of a material which may be in intimate contact with the ocular environment for an extended period of time without significantly damaging the ocular environment and without significant user discomfort.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens, preferably according to the procedures described in Example 1.

HLB represents the hydrophilic-lipophilic balance (HLB) of an amphiphilic molecule and its value is obtained by dividing the weight percentage of the hydrophilic part by five.

In this application, "7 cycles of simulated 1-day-wearing extraction" or "7 cycles of S1DW extraction" interchangeably refers to an aqueous extraction process consisting of: (a) $1^{st}$ cycle of simulated 1-day-wearing extraction which involves taking out and blotting one to three readily-usable SiHy contact lenses from sealed packages, soaking the blotted readily-usable SiHy contact lenses together in 1.0 mL of fresh phosphate buffered saline (PBS) (which has a pH of 7.2±0.2 at 25° C. and contains about 0.076 wt. % $NaH_2PO_4$—$H_2O$, about 0.31 wt. % $Na_2HPO_4$.$2H_2O$, and about 0.77 wt. % NaCl) as extraction medium in one vial for 24 hours at 35° C. with agitation, pipetting out all the PBS used in the 1st cycle of S1DW extraction from the vial, and analyzing the pipetted-out PBS which is used in the 1st cycle of S1DW extraction; and (b) $2^{nd}$ to $7^{th}$ cycles of S1DW extraction each of which involves adding 1.0 mL of fresh PBS as extraction medium into the vial containing the readily-usable SiHy contact lenses which have been subjected to proceeding cycle of S1DW extraction, soaking the readily-usable SiHy contact lenses in the added 1 mL of the fresh PBS as extraction medium for 24 hours at 35° C. with agitation, pipetting out all the PBS used in current cycle of S1DW extraction from the vial, and analyzing the pipetted-out PBS which is used in the current cycle of S1DW extraction. Each extraction medium used in each of the 7 cycles of S1DW extraction can be analyzed by any method known to a person skilled in the art, preferably by UPLC method.

In accordance with the invention, the step of soaking one readily-usable SiHy contact lenses in 1.0 mL of fresh PBS at 35° C. for 24 hours is intended to simulate wearing the readily-usable SiHy lens on an eye by a patient for one day (8 to 24 hours). It should point out that the volume of fresh PBS in each cycle is selected to be comparable to a normal average tear product by eyes per day. Schirmer in his classical study of the tear secretion in 1903 estimated that the quantity of tears produced in 16 waking hours under basal circumstances to be 0.5 to 0.75 grams (Schirmer, O. Graefes Arhiv für Ophthalmologie 1903, 56: 197-291).

It is understood that the number of readily-usable SiHy contact lenses to be used in the 7 cycles of simulated 1-day-wearing extraction studies depends upon the detection limit of a selected analytical method (e.g., UPLC) and the leaching amount of polymeric surfactant per lens per 24 hours. A higher number of readily-usable SiHy contact lenses can be used in the 7 cycles of simulated 1-day-wearing extraction studies to increase the accuracy and reliability of the tests as known to a person skilled in the art.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula.

UVA % $T$=Average % Transmission between 315 nm and 380 nm×100

UVB % $T$=Average % Transmission between 280 nm and 315 nm×100

Violet % $T$=Average % Transmission between 380 nm and 440 nm×100

The term "inherently wettable" or "naturally wettable" in reference to a SiHy contact lens interchangeably means that the SiHy has water-break-up-time (WBUT) of about 5 seconds or more and a water contact angle (WCAs) by static sessile drop method of about 90 degree or less without being subjected to any surface treatment after the SiHy contact lens is formed by thermally or actinically polymerizing (i.e., curing) a SiHy lens formulation. In accordance with the invention, WBUT and WCAs are measured according to the procedures described in Example 1.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Pat. Appl. Pub. Nos. 2011/0134387, 2012/0026457 and 2013/0118127.

"Post-curing surface treatment", in reference to a SiHy contact lens, means a surface treatment process that is performed after the SiHy contact lens is formed by curing (i.e., thermally or actinically polymerizing) a SiHy lens formulation. A "SiHy lens formulation" refers to a polymerizable composition that comprises all necessary polymerizable components for producing a SiHy contact lens or a SiHy lens bulk material as well known to a person skilled in the art.

The invention is generally related to an ophthalmic product which comprises a sealed and autoclave-sterilized lens package including a packaging solution and a readily-usable SiHy contact lens immersed in the packaging solution. The packaging solution comprises a polymeric surfactant having an HLB value of from about 11 to about 16 and a number average molecular weight of from about 800 to about 20,000 Daltons. The readily-usable SiHy contact lens comprises such a polymeric surfactant thereon (i.e., surface-bound or surface-adsorbed polymeric surfactant), providing an excellent wettability to the readily-usable SiHy contact lens directly out of the lens package. It is believed that at least a significant portion of the polymeric surfactant adsorbed on the lens surface could be released into the tear of an eye shortly after being inserted on the eye. Considering that a normal average tear volume is 6.2±2.0 µL (S. Mishima et al., Invest. Ophthalmol. Vis. Sci. 1966, 5: 264-276), the concentration of the polymeric surfactant in the tear could be very high shortly after the lens insert on the eye, providing a good wettability to the eye. The readily-usable SiHy contact lens also comprises the leachable polymeric surfactant which is uptaken (absorbed) physically by the SiHy contact lens during autoclave and is physically distributed in the polymer matrix of the SiHy contact lens. The polymeric surfactant physically absorbed and distributed in the readily-usable SiHy contact lens can be released to the eye of a patient for at least 7 days of daily wear and to replenish the lens surface-bound polymeric surfactant, thereby providing sustainable wettabilities to the contact lens and the eye. The readily-usable SiHy contact lens with these two features can provide wearing comfort to the patient for at least one week of wearing. As such, SiHy contact lenses of the invention are suitable to be used as weekly-disposable contact lenses.

This invention is partly based on the surprise discovery that SiHy contact lenses, which have a relatively high equilibrium water content (at least 38% preferably at least 40%), relatively low elastic modulus (e.g., lower than 1.5 MPa) and relatively high oxygen permeability (e.g., at least 50 Barrers) and is free of any coating thereon, can be rendered to have the two desirable features described above simply by packaging and autocalving the SiHy contact lens in a lens package containing a polymeric surfactant which is composed of at least one hydrophilic poly(oxyethylene) segment and at least one hydrophobic poly(oxybutylene) segment and has an HLB value of from about 11 to about 16 and a number average molecular weight of from about 800 to about 20,000 Daltons and which is present in the lens packaging solution in an amount sufficient low to not increase significantly the lens diameters but still sufficient to provide the SiHy contact lenses with the two desirable features.

It is believed that where a SiHy contact lens has an oxygen permeability of at least 50 barrers, it can have hydrophobic (i.e., silicone) regions intermingled with hydrophilic regions in a microscopic scale. The number of such microscopic hydrophobic regions could be sufficiently high to solubilize a significant amount of a polymeric surfactant having an HLB value of from about 11 to about 16.

It is also believed that where a SiHy contact lens has an elastic modulus of from about 0.2 MPa to about 1.5 MPa and an equilibrium water content of from about 38% to about 80% by weight, it can have pores with size big enough for a sufficient amount of a polymeric surfactant having a number average molecular weight of from about 800 to about 20,000 Daltons to penetrate inside the SiHy contact lens during autoclave and storage and to subsequently leach out of the SiHy contact lens when being worn on an eye.

It is further believed that the unique amphiphilic nature of a polymeric surfactant of the invention enables it to be physically attached onto the surface of the above-described SiHy contact lens and to be physically distributed within the polymer matrix of the above-described SiHy contact lens. The hydrophobic poly(oxybutylene) segment(s) of the polymeric surfactant can have hydrophobic interactions with the silicone patches on the lens surface and silicones just beneath the surface and with the microscopic hydrophobic regions inside the SiHy contact lens. Such hydrophobic-hydrophobic interactions provide the driving forces for the polymeric surfactant to bind physically onto the lens surface (forming a surface layer) and to penetrate into the lens. It is further believed that the polymeric surfactant would be located at the interface between the microscopic hydrophobic and hydrophilic region for minimizing the surface energy due to its amphiphilic nature, thereby reducing the rate of migration of the polymeric surfactant from inside the SiHy contact lens into ocular environment during wear.

Typically, contact lenses, which are hydrated and packaged in a packaging solution, must be sterilized before providing to patients. Sterilization of the hydrated lenses during manufacturing and packaging is typically accomplished by autoclaving. The autoclaving process involves heating the packaging of a contact lens to a temperature of from about 118° C. to about 125° C. for approximately 20-50 minutes under pressure. It is found that, during autoclave, such a polymeric surfactant present in a packaging solution not only can be physically attached onto the surface of the SiHy contact lens, but also can penetrate deeply into the SiHy contact lens so as to be distributed within the polymer matrix of the SiHy contact lens. The efficiency for the penetration of the polymeric surfactant into the above-described SiHy contact lens during the autoclave could be sufficiently high, so as to lower the concentration of the polymeric surfactant in the lens packaging solution while still incorporating a sufficient amount of the leachable polymeric surfactant which can be released to the eye of a patient for at least 7 days of daily wear to provide sustainable wettabilities to the contact lens.

It is known that the hydrophobic interactions (forces) are strongly temperature dependent, the higher temperature, the stronger the hydrophobic-hydrophobic interactions and the stronger the driving force for the polymeric surfactant to penetrate (diffuse) into the SiHy contact lens is. It is believed that during autoclave, the penetration of the polymeric surfactant present in the packaging solution into the SiHy contact lens would be significantly accelerated so that a significant amount of the polymeric surfactant can be incorporated in the SiHy contact lens.

It should point out that although the autoclave process can accelerate the penetration process of the polymeric surfactant, it may still not be sufficient for the polymeric surfactant to achieve its distribution equilibrium between the packaging solution and the silicone hydrogel contact lens. During the storage at room temperature of the sealed and autoclaved lens packages with the readily-available SiHy contact lenses therein, the amount the polymeric surfactant uptaken by the silicone hydrogel contact lens is likely to increase over the time until reaching the equilibrium. Such a post-autoclave slow uptaking process of the polymeric surfactant by a silicone hydrogel contact lens immersed in a packaging solution in a sealed lens package would ensure that a higher amount of the polymeric surfactant will be uptaken by the silicone hydrogel contact lens and subsequently a higher amount of the polymeric surfactant will be released when being worn on eye.

It should also point out that a SiHy contact lens of the invention cannot be prepared from a SiHy lens formulation including a polymeric surfactant having a number average molecular weight of from about 800 to about 20,000 Daltons, because the polymeric surfactant is very likely to be removed from resultant SiHy contact lenses during lens extraction and hydration processes required for producing SiHy contact lenses.

By using the method of the invention, the adsorption of a polymeric surfactant on the lens surface and the incorporation of the polymeric surfactant into the lens can be combined with the sterilization step (autoclave) in the manufacturing of SiHy contact lenses. The resultant contact lenses not only can have a combination of the desired contact lens properties including relatively high oxygen permeability, relatively high water content, relatively low modulus, and a good surface wettability, but also the two features described above.

The present invention, in one aspect, provides an ophthalmic product comprising a sealed and autoclave-sterilized package which include a post-autoclave packaging solution and a readily-usable silicone hydrogel contact lens immersed therein, wherein the post-autoclave packaging solution is a buffered saline having a pH of from about 6.0 to about 8.0 (preferably from about 6.5 to about 7.5) and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons (preferably from about 800 to about 10,000 Daltons, more preferably from about 1,000 to about 8,000 Daltons), wherein the readily-usable silicone hydrogel contact lens is obtained by placing, sealing and autoclaving a pre-formed silicone hydrogel contact lens in a pre-autoclave packaging solution including the polymeric surfactant in a package, wherein the pre-formed silicone hydrogel contact lens is free of any coating thereon, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 µg/lens/24 hours (preferably at least 0.4 µg/lens/24 hours, more preferably at least 0.6 µg/lens/24 hours, even more preferably at least 0.8 µg/lens/24 hours, most preferably at least 1.0 µg/lens/24 hours) as measured in an aqueous extraction process consisting of 7 cycles of simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction, wherein the readily-usable silicone hydrogel contact lens further has a first static water contact angle, $WCA_{OOP}$, of about 75° or less (preferably about 70° or less, more preferably about 65° or less, even more preferably about 60° or less) as measured directly out of the sealed package by sessile drop method, a second static water contact angle, $WCA_{7\_S1DW}$, of about 85° or less (preferably about 80° or less, more preferably 75° or less, even more preferably 70° or less) as measured by sessile drop method immediately after being subjected to the 7 cycles of the simulated 1-day-wearing extraction, an oxygen permeability of at least 50 barrers, an elastic modulus of from about 0.2 MPa to about 1.5 MPa, and an equilibrium water content of from about 38% to about 80% by weight.

The present invention, in another aspect, provides a method for producing an ophthalmic product. The method of the invention comprises the steps of: a) placing and sealing a pre-formed silicone hydrogel contact lens in a container containing a pre-autoclave packaging solution, wherein the pre-formed silicone hydrogel contact lens is free of any coating and has an oxygen permeability of at least 50 barrers, an elastic modulus of from about 0.2 MPa to about 1.5 MPa, and an equilibrium water content of from about 38% to about 80% by weight, wherein the pre-autoclave packaging solution is a buffered saline having a pH of from about 6.0 to about 8.0 (preferably from about 6.5 to about 7.5) and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons (preferably from about 800 to about 10,000 Daltons, more preferably from about 1,000 to about 8,000 Daltons); and b) autoclaving the sealed package containing the preformed silicone hydrogel contact lens therein for at least about 30 minutes to obtain the ophthalmic product, wherein the ophthalmic product comprises a readily-usable silicone hydrogel contact lens in the sealed and autoclave-sterilized package, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 µg/lens/24 hours (preferably at least 0.4 µg/lens/24 hours, more preferably at least 0.6 µg/lens/24 hours, even more preferably at least 0.8 µg/lens/24 hours, most preferably at least 1.0 µg/lens/24 hours) as measured in an aqueous extraction process consisting of 7 cycles of simulated 1-day-wearing extraction, a first static water contact angle, $WCA_{OOP}$, of about 75° or less (preferably about 70° or less, more preferably about 65° or less, even more preferably about 60° or less) as measured directly out of the sealed package by sessile drop method, and a second static water contact angle, $WCA_{7\_S1DW}$, of about 85° or less (preferably about 80° or less, more preferably 75° or less, even more preferably 70° or less) as measured by sessile drop method immediately after being subjected to the 7 cycles of the simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction.

In accordance with the invention, the first static water contact angle, $WCA_{OOP}$, of a readily-usable SiHy contact lens is derived from the polymeric surfactant that has been adsorbed on the surface of the readily-usable SiHy contact lens and that has been absorbed in a region just beneath lens surface during autoclave, whereas the second static water contact angle, $WCA_{7\_S1DW}$, of the readily-usable SiHy contact lens is derived from the polymeric surfactant that has been physically absorbed and distributed in the polymer matrix of the readily-usable SiHy contact lens during autoclave and that has migrated from a region deepin inside the lens to the surface region just beneath lens surface and onto the lens surface during the last cycle of the 7 cycles of the simulated 1-day-wearing extraction.

Lens packages (or containers) are well known to a person skilled in the art for autoclaving and storing a contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and autoclave-sterilized (e.g., sterilized by autoclave at about 120° C. or higher for from about 30 minutes to about 45 minutes under pressure) prior to dispensing to users. A person skilled in the art will understand well how to seal and autoclave-sterilize lens packages.

In accordance with the invention, a pre- or post-autoclave packaging solution is ophthalmically compatible and is any water-based solution that is used for the storage of contact lenses as known to a person in the art.

A pre- or post-autoclave packaging solution of the invention is a buffered saline solution.

In this application, the term "a buffered saline" refers to an aqueous solution that contains from about 0.15% to 0.95% by weight of one or more salts (e.g., sodium chloride, potassium chloride, or any ophthalmically compatible salts known to a person skilled in the art) and one or more buffering agents for maintaining the pH of the saline.

The pre- or post-autoclave packaging solution contains one or more buffering agents for maintaining the pH of the packaging solution in a physiologically acceptable range of about 6 to about 8 (preferably from about 6.5 to about 7.5). Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis (2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis (2-ethanesulfonic acid), TES (N-[Tris(hydroxymethyl) methyl]-2-aminoethanesulfonic acid), salts thereof, phosphate buffers (e.g. $Na_2HPO_4$, $NaH_2PO_4$, and $KH_2PO_4$) or mixtures thereof. Preferred buffering agents are borate buffers and phosphate buffers. The amount of each buffer agent is that amount necessary to be effective in achieving a pH of the composition of from about 6.5 to about 7.5. Typically, it is present in an amount of from 0.001% to 2%, preferably from 0.01% to 1%; most preferably from about 0.05% to about 0.30% by weight.

In accordance with the invention, the pre- and post-autoclave packaging solutions comprise a polymeric surfactant, which must include at least one poly(oxyethylene) segment as the hydrophilic component and a poly(oxybutylene) segment as the hydrophobic component. It can be a di-block copolymer, denoted as PEO-PBO, a tri-block copolymer, denoted as PEO-PBO-PEO or PBO-PEO-PBO, or other block-type configurations. Unless expressly indicated to the contrary, all references to "PEO-PBO block copolymers" herein include all of the foregoing forms. These copolymers may also be described in terms of the approximate or average value assigned to the respective repeating group. For example, R-$(EO)_{20}(BO)_5$—H, where the average value of the oxyethylene (EO) group is 20, and the average value of the oxybutylene (BO) group is 5.

Preferred polymeric surfactants of the present invention are di-block copolymers of the following general formula:

$$R\text{-}(EO)_m(BO)_n\text{—H} \qquad (S1)$$

wherein R is selected from the group consisting of hydrogen, methyl, ethyl, propyl and butyl; m is an integer having an average value of 10 to 250; and n is an integer having an average value of 5 to 125, provided that the value of m/n is from about 2:1 to about 10:1, preferably from about 3:1 to about 6:1.

PEO-PBO di-block copolymers of the following general formula are particularly preferred:

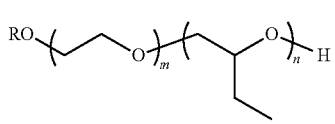

(S2)

wherein R is selected from the group consisting of hydrogen, methyl, ethyl, propyl and butyl; m is an integer having an average value of 10 to 250; and n is an integer having an average value of 5 to 125, provided that the value of m/n is from about 2:1 to about 10:1, preferably from about 3:1 to about 6:1.

Most preferred is a copolymer of formula (S2) wherein R is methyl; m has an average value of 45; and n has an average value of 10.

The PEO-PBO block copolymers utilized in the present invention have a molecular weight in the range of 800 to about 10,000 Daltons; and more preferably in the range of 1,000 to about 8,000 Daltons.

In accordance with the invention, the number average molecular weight of a polymeric surfactant is determined according to $^1$H NMR spectroscopy. The use of $^1$H NMR spectroscopy in determining the molecular weight of polymers has been reported in publications, e.g., J. U. Izunobi & C. L. Higginbotham, J. Chem. Edu. 2011, 88: 1098-1104; S C. Shit and S. Maiti, Eur. Polym. J. 1986, 22: 1001-1008; K. J. Liu, Makromol. Chem. 1968, 116: 146-151; F. W. Yeager & J. W. Becker, Anal. Chem. 1977, 49: 722-724; E. G. Brame, R. C. Ferguson, G. J. Thomas, Anal. Chem. 1967, 39: 517-521; T. F. Page & W. E. Bresler, Anal. Chem. 1964, 36: 1981-1985; T. Cosgrove et al., Langmuir 2015, 31: 8469-8477; G. B. Shah, exPRESS Polm. Lett. 2008, 2: 829-834; K. J. Liu, Macromecules, 1968, 1: 213-217; K. Paulsen & D. Frasco, ThermoFisher Application Note Pub. No. AN52907_E_11/16M (2016).

The PEO-PBO block copolymers described above may be synthesized according to procedures described in U.S. Pat. No. 8,318,144 (herein incorporated in reference in its entirety).

It is discovered that when the concentration of the polymeric surfactant is too high in the pre-autoclave packaging solution, the readily-usable SiHy contact lens may have a significantly altered lens diameter due to the penetration of a significant amount of the polymeric surfactant into the lens. In accordance with the invention, the amount of the polymeric surfactant in the pre-autoclave packaging solution is selected to ensure that difference in lens diameter between the readily-usable SiHy contact lens autoclaved in a packaging solution containing a polymeric surfactant according to the present invention) and control lens which is the preformed SiHy contact lens autoclaved in phosphate buffered saline free of the polymeric surfactant is less than about 0.20 mm (preferable about 0.17 mm, more preferably about 0.14 mm, even more preferably about 0.11 mm) and that the readily-usable SiHy contact lens comprises at least about 25 μg/lens (preferably at least about 30 μg/lens, more preferably at least about 35 μg/lens, even more preferably at least about 40 μg/lens, most preferably at least about 50 or 60 or 70 or 80 or 90 μg/lens) of the polymeric surfactant.

In a preferred embodiment, the amount of the polymeric surfactant in the pre-autoclave packaging solution is from about 0.005% to about 0.038% by weight (preferably from about 0.007% to about 0.036% by weight, more preferably from about 0.008% to about 0.034% by weight, even more preferably from about 0.009% to about 0.032% by weight, most preferably from about 0.010% to about 0.030% by weight).

In accordance with the invention, the amount of the polymeric surfactant in the readily-usable SiHy contact lens is an average value obtained by averaging the amounts of the polymeric surfactant in 5 readily-usable SiHy contact lenses. The amount of polymeric surfactant in each readily-usable SiHy contact lens is determined by first completely extracting the polymeric surfactant from the readily-usable SiHy contact lens with an extraction medium (e.g., a mixture of 1:1 acetone/hexane) and then determining the amount of the polymeric surfactant in the extraction medium.

It is understood also that the autoclave duration can also affect the amount of the polymeric surfactant uptaken by a readily-usable SiHy contact lens. The longer the autoclave time, the higher the amount of the polymeric surfactant uptaken by the readily-usable SiHy contact lens.

The pre-autoclave packaging solutions according to the invention are preferably formulated in such a way that they are isotonic with the lachrymal fluid. A solution which is isotonic with the lachrymal fluid is generally understood to be a solution whose concentration corresponds to the concentration of a 0.9% sodium chloride solution (308 mOsm/kg). Deviations from this concentration are possible throughout.

The isotonicity with the lachrymal fluid, or even another desired tonicity, may be adjusted by adding organic or inorganic substances that affect the tonicity. Suitable occularly acceptable tonicity agents include, but are not limited to sodium chloride, potassium chloride, glycerol, propylene glycol, polyols, mannitols, sorbitol, xylitol and mixtures thereof. Preferably, the majority of the tonicity of the solution is provided by one or more compounds selected from the group consisting of non-halide containing electrolytes (e.g., sodium bicarbonate) and non-electrolytic compounds. The tonicity of the solution is typically adjusted to be in the range from about 200 to about 450 milliosmol (mOsm), preferably from about 250 to 350 mOsm.

In a preferred embodiment, the pre-autoclave packaging solution comprises from about 0.1% to about 2% by weight of a high molecular weight hydrophilic polymer (i.e., having a number average molecular weight of at least 100,000 Daltons, preferably at least 200,000 Dalton). Preferably, the high molecular weight hydrophilic polymer is a polyvinylpyrrolidone or more preferably a copolymer of N-vinylpyrrolidone and at least one amino-containing vinylic monomer, wherein the amino-containing vinylic monomer is selected from the group consisting of alkylaminoalkylmethacrylate having 8-15 carbon atoms, alkylaminoalkylacrylate having 7-15 carbon atoms, dialkylaminoalkylmethacrylate having 8-20 carbon atoms, dialkylaminoalkylacrylate having 7-20 carbon atoms, and N-vinylalkylamide having 3-10 carbon atoms.

In accordance with the invention, the number average molecular weight of a high molecular weight hydrophilic polymer is determined by GPC/RI (refractive index)/LS (light scattering) method under the following conditions:

Columns: 2× Waters Ultra-Hydrogel Linear 300×7.8 mm column set

Mobile Phase: 0.2M sodium nitrate and 0.02% (w/w) sodium azide (aqueous) for multi-angle laser light scattering (MALLS)

Temperature: 25° C. MALLS

MALLS Detector: Waters Alliance e-2695 with RI/LS (Wyatt DAWN)

Flow Rate: 0.5 mL/min (nominal)

Injection Volume: 0.100 mL

Standards: poly(ethylene glycol), poly(ethylene oxide), poly (acrylamide) from American Polymer Standard Corporation; poly(saccharide) from Polymer Laboratories Sample preparation: 90° C. for 30 min in aqueous mobile phase pre-filtered through 0.45 uM syringe filter (HT Tuffryn membrane, PALL, PN 4497T) into auto sampler vials Examples of amino-containing vinylic monomers include without limitation alkylaminoalkylmethacrylate having 8-15 carbon atoms, alkylaminoalkylacrylate having 7-15 carbon atoms, dialkylaminoalkylmethacrylate having 8-20 carbon atoms, dialkylaminoalkylacrylate having 7-20 carbon atoms, N-vinylalkylamide having 3-10 carbon atoms.

Examples of preferred N-vinyl alkylamide include without limitation N-vinyl formaide, N-vinyl acetamide, N-vinyl isopropylamide, and N-vinyl-N-methyl acetamide.

Examples of preferred copolymers includes without limitation copolymers of N-vinylpyrrolidone and dimethylaminoethylmethacrylate. Such preferred copolymers are commercially available, e.g., Copolymer 845 and Copolymer 937 from ISP.

It is believed that in the pre-autoclave packaging solution for packaging and autoclaving a pre-formed SiHy contact lens free of any coating, a high molecular weight hydrophilic polymer can have synergy with a polymeric surfactant in reducing the static water contact angle of a readily-usable SiHy contact lens (i.e., improving the wettability of the readily-usable SiHy contact lens). It is also believed that a high molecular weight hydrophilic polymer, in particular, a polyvinylpyrrolidone or more preferably a copolymer of N-vinylpyrrolidone and at least one amino-containing vinylic monomer, may form complex with a polymeric surfactant on or near the surface of silicone hydrogel contact to function as carrier for the polymeric surfactant and thereby to enhance the uptake of the polymeric surfactant by the polymer matrix of the silicone hydrogel contact lens.

A pre-autoclave packaging solution of the invention can optionally include a viscosity-enhancing polymers, which can be a water soluble cellulose-derived polymer, a water-soluble polyvinylalcohol (PVA), or combination thereof. Examples of useful cellulose-derived polymers include without limitation cellulose ethers. Exemplary preferred cellulose ethers are methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof. More preferably, a cellulose ether is hydroxyethyl cellulose (HEC), hydroxypropylmethyl cellulose (HPMC), and mixtures thereof. The cellulose ether is present in the composition in an amount of preferably from about 0.1% to about 1% by weight, based on the total amount of the packaging solution.

In accordance with the invention, the pre-autoclave packaging solution can further comprises mucin-like materials, ophthalmically beneficial materials, and/or additional surfactants.

Exemplary mucin-like materials include without limitation polyglycolic acid and polylactides.

Exemplary ophthalmically beneficial materials include without limitation 2-pyrrolidone-5-carboxylic acid (PCA), amino acids (e.g., taurine, glycine, etc.), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of preferred surfactants as additional surfactants include without limitation poloxamers (e.g., Pluronic® F108, F88, F68, F68LF, F127, F87, F77, P85, P75, P104, and P84), poloamines (e.g., Tetronic® 707, 1107 and 1307, polyethylene glycol esters of fatty acids (e.g., Tween® 20, Tween® 80), polyoxyethylene or polyoxypropylene ethers of $C_{12}$-$C_{18}$ alkanes (e.g., Brij® 35), polyoxyethyene stearate (Myrj®52), polyoxyethylene propylene glycol stearate (Atlas® G 2612), and amphoteric surfactants under the trade names Mirataine® and Miranol®.

In accordance with all the various aspects of the invention, a pre-formed SiHy contact lens of the invention can be any SiHy contact lens that has not been subjected to any surface treatment to form a coating thereon after being produced according to any lens manufacturing processes. A person skilled in the art knows very well how to make SiHy contact lenses. For example, SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,163; 5,789,464; and 5,849,810, or by lathe cutting of polymeric material buttons as used in making customized contact lenses. In cast-molding, a polymerizable composition (i.e., a SiHy lens formulation) typically is dispensed into molds and cured (i.e., polymerized and/or crosslinked) in molds for making SiHy contact lenses.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G. E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a SiHy contact lens. Crosslinking may be initiated thermally or actinically, preferably by exposing the polymerizable composition in the mold to a spatial limitation of actinic radiation to crosslink the polymerizable components in the polymerizable composition.

Opening of the mold so that the molded SiHy contact lens can be removed from the mold may take place in a manner known per se.

The molded SiHy contact lens are subjected to lens extraction to remove unpolymerized polymerizable components and then to the lens hydration. The extraction solvent can be any solvent known to a person skilled in the art. Examples of suitable extraction solvent are those described below.

Pre-formed SiHy contact lenses can be any commercially-available SiHy contact lenses or can be produced according to any known methods. For example, for production of pre-formed SiHy contact lenses, a SiHy lens formulation for cast-molding or spin-cast molding or for making SiHy rods used in lathe-cutting of contact lenses generally comprises at least one components selected from the group consisting of a silicone-containing vinylic monomer, a polysiloxane vinylic crosslinker, a silicone-containing prepolymer, a hydrophilic vinylic monomer, a hydrophobic vinylic monomer, a non-silicone vinylic crosslinker, a free-radical initiator (photoinitiator or thermal initiator), a silicone-containing prepolymer, and combination thereof, as well known to a person skilled in the art. Resultant SiHy contact lenses then are subjected to extraction with an extraction solvent to remove unpolymerized components from the resultant lenses and to hydration process, as known by a person skilled in the art. In addition, a pre-formed SiHy contact lens can be a colored contact lens (i.e., a SiHy contact lens having at least one colored patterns printed thereon as well known to a person skilled in the art).

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy) silyl group, polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166, 236, 6,867,245, 8,415,405, 8,475,529, 8,614,261, and 9,217, 813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha, omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (I), are described later in this application and can be prepared according to the procedures disclosed in U.S. patent Ser. No. 10/081,697.

Another class of preferred polysiloxane vinylic crosslinkers are vinylic crosslinkers of formula (1), which are described later in this application and can be obtained from commercial suppliers; prepared by reacting glycidyl (meth) acrylate (meth)acryloyl chloride with a di-amino-terminated polydimethylsiloxane or a di-hydroxyl-terminated polydimethylsiloxane; prepared by reacting isocyantoethyl (meth) acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers of any one of formula (2) to (7), which are described later in this application and can be prepared according to the procedures described in U.S. Pat. Nos. 5,034,461, 5,416, 132, 5,449,729, 5,760,100, 7,423,074, 8,529,057, 8,835,525, 8,993,651, and 10,301,451 and in U.S. Pat. App. Pub. No. 2018-0100038 A1.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173@ and Darocur 2959@, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

A SiHy contact lens formulation can also comprise other necessary components known to a person skilled in the art, such as, for example, a UV-absorbing vinylic monomer, a high-energy-violet-light ("HEVL") absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable polymeric wetting agents (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidinone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. An ophthalmic product, comprising a sealed and autoclave-sterilized package which include a post-autoclave packaging solution and a readily-usable silicone hydrogel contact lens immersed therein,
    wherein the post-autoclave packaging solution is a buffered saline having a pH of from about 6.0 to about 8.0 and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons, wherein the readily-usable silicone hydrogel contact lens is obtained by placing, sealing and autoclaving a pre-formed silicone hydrogel contact lens in a pre-autoclave packaging solution including the polymeric surfactant in a package, wherein the pre-formed silicone hydrogel contact lens is free of any coating thereon, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 µg/lens/24 hours as measured in an aqueous extraction process consisting of 7 cycles of simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction, wherein the readily-usable silicone hydrogel contact lens further has a first static water contact angle, $WCA_{OOP}$, of about 75° or less as measured directly out of the sealed package by sessile drop method, a second static water contact angle, $WCA_7\_S1DW$, of about 85° or less as measured by sessile drop method immediately after being subjected to the 7 cycles of the simulated 1-day-wearing extraction, an oxygen permeability of at least 50 barrers, an elastic modulus of from about 0.2 MPa to about 1.5 MPa, and an equilibrium water content of from about 38% to about 80% by weight.

2. A method for producing ophthalmic products, comprising the steps of:
    a) placing and sealing a pre-formed silicone hydrogel contact lens in a container containing a pre-autoclave packaging solution, wherein the pre-formed silicone hydrogel contact lens is free of any coating and has an oxygen permeability of at least 50 barrers, an elastic modulus of from about 0.2 MPa to about 1.5 MPa, and an equilibrium water content of from about 38% to about 80% by weight, wherein the pre-autoclave packaging solution is a buffered saline having a pH of from about 6.0 to about 8.0 and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons; and
    b) autoclaving the sealed package containing the pre-formed silicone hydrogel contact lens therein for at least about 30 minutes to obtain an ophthalmic product, wherein the ophthalmic product comprises a readily-usable silicone hydrogel contact lens immersed in a post-autoclave packaging solution in the sealed and autoclaved package, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 µg/lens/24 hours as measured in an aqueous extraction process consisting of 7 cycles of simulated 1-daywearing extraction, a first static water contact angle, $WCA_{OOP}$, of about 75° or less as measured directly out of the sealed package by sessile drop method, and a second static water contact angle, $WCA_{7\_S1DW}$, of about 85° or less as measured by sessile drop method immediately after being subjected to the 7 cycles of the simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction.

3. The ophthalmic product of embodiment 1 or the method of embodiment 2, wherein the polymeric surfactant has a number average molecular weight of from about 800 to about 10,000 Daltons.

4. The ophthalmic product of embodiment 1 or the method of embodiment 2, wherein the polymeric surfactant has a number average molecular weight of from about 1,000 to about 8,000 Daltons.

5. The ophthalmic product of embodiment 1, 3 or 4 or the method of any one of embodiments 2 to 4, wherein the post-autoclave packaging solution has a pH of from about 6.5 to about 7.5.

6. The ophthalmic product of any one of embodiments 1 and 3 to 5 or the method of any one of embodiments 2 to 5, wherein the readily-usable silicone hydrogel contact lens has a $WCA_{OOP}$ of about 70° or less as measured directly out of the sealed package by sessile drop method and optionally a $WCA_7\_S1DW$ of about 80° or less as measured by sessile drop method immediately after being subjected to the 7 cycles of the simulated 1-day-wearing extraction.

7. The ophthalmic product of any one of embodiments 1 and 3 to 5 or the method of any one of embodiments 2 to 5, wherein the readily-usable silicone hydrogel contact lens has a $WCA_{OOP}$ of about 65° or less as measured directly out of the sealed package by sessile drop method and optionally a $WCA_{7\_S1DW}$ of about 75° or less as measured by sessile drop method immediately after being subjected to the 7 cycles of the simulated 1-day-wearing extraction.

8. The ophthalmic product of any one of embodiments 1 and 3 to 5 or the method of any one of embodiments 2 to 5, wherein the readily-usable silicone hydrogel contact lens has a $WCA_{OOP}$ of about 60° or less as measured directly out of the sealed package by sessile drop method and optionally a $WCA_7\_S1DW$ of about 70° or less as measured by sessile drop method immediately after being subjected to the 7 cycles of the simulated 1-day-wearing extraction.

9. The ophthalmic product of any one of embodiments 1 and 3 to 8 or the method of any one of embodiments 2 to 8, wherein the readily-usable silicone hydrogel contact lens has a capability of releasing the polymeric surfactant in an amount of at least 0.4 μg/lens/24 hours as measured in the aqueous extraction process consisting of the 7 cycles of the simulated 1-day-wearing extraction.

10. The ophthalmic product of any one of embodiments 1 and 3 to 8 or the method of any one of embodiments 2 to 8, wherein the readily-usable silicone hydrogel contact lens has a capability of releasing the polymeric surfactant in an amount of at least 0.6 μg/lens/24 hours as measured in the aqueous extraction process consisting of the 7 cycles of the simulated 1-day-wearing extraction.

11. The ophthalmic product of any one of embodiments 1 and 3 to 8 or the method of any one of embodiments 2 to 8, wherein the readily-usable silicone hydrogel contact lens has a capability of releasing the polymeric surfactant in an amount of at least 0.8 μg/lens/24 hours as measured in the aqueous extraction process consisting of the 7 cycles of the simulated 1-day-wearing extraction.

12. The ophthalmic product of any one of embodiments 1 and 3 to 8 or the method of any one of embodiments 2 to 8, wherein the readily-usable silicone hydrogel contact lens has a capability of releasing the polymeric surfactant in an amount of at least 1.0 μg/lens/24 hours as measured in the aqueous extraction process consisting of the 7 cycles of the simulated 1-day-wearing extraction.

13. The ophthalmic product of any one of embodiments 1 and 3 to 12 or the method of any one of embodiments 2 to 12, wherein the polymeric surfactant is a di-block copolymer designated as PEO-PBO or a tri-block copolymer designated as PEO-PBO-PEO or PBO-PEO-PBO, in which PEO represents poly(oxyethylene) segment and PBO represents poly(oxybutylene) segment.

14. The ophthalmic product of any one of embodiments 1 and 3 to 12 or the method of any one of embodiments 2 to 12, wherein the polymeric surfactant is a di-block copolymer of formula (S1)

$$RO\text{-}(EO)_m(BO)_n\text{-}H \tag{S1}$$

wherein: R is selected from the group consisting of hydrogen, methyl, ethyl, propyl and butyl; EO is ethyleneoxide —$C_2H_4O$—; BO is butyleneoxide —$C_4H_8O$—; m is an integer having an average value of 10 to 250; and n is an integer having an average value of 5 to 125, provided that the value of m/n is from about 2:1 to about 10:1.

15. The ophthalmic product or the method of embodiment 14, wherein in formula (S1) the value of m/n is from about 3:1 to about 6:1.

16. The ophthalmic product of any one of embodiments 1 and 3 to 12 or the method of any one of embodiments 2 to 12, wherein the polymeric surfactant is a di-block copolymer of formula (S2)

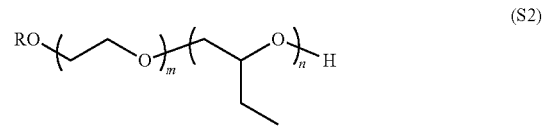

(S2)

wherein R is selected from the group consisting of hydrogen, methyl, ethyl, propyl and butyl; m is an integer having an average value of 10 to 250; and n is an integer having an average value of 5 to 125, provided that the value of m/n is from about 2:1 to about 10:1.

17. The ophthalmic product or the method of embodiment 16, wherein in formula (S1) the value of m/n is from about 3:1 to about 6:1.

18. The ophthalmic product or the method of embodiment 16 or 17, wherein in formula (S1) R is methyl.

19. The ophthalmic product or the method of any one of embodiments 16 to 18, wherein in formula (S1) m has an average value of 45 and n has an average value of 10.

20. The ophthalmic product of any one of embodiments 1 and 3 to 19 or the method of any one of embodiments 2 to 19, wherein the readily-usable silicone hydrogel contact lens comprises at least about 25 μg/lens of the polymeric surfactant.

21. The ophthalmic product of any one of embodiments 1 and 3 to 19 or the method of any one of embodiments 2

21. ...to 19, wherein the readily-usable silicone hydrogel contact lens comprises at least about 30 μg/lens of the polymeric surfactant.
22. The ophthalmic product of any one of embodiments 1 and 3 to 19 or the method of any one of embodiments 2 to 19, wherein the readily-usable silicone hydrogel contact lens comprises at least about 35 μg/lens of the polymeric surfactant.
23. The ophthalmic product of any one of embodiments 1 and 3 to 19 or the method of any one of embodiments 2 to 19, wherein the readily-usable silicone hydrogel contact lens comprises at least about 40 μg/lens of the polymeric surfactant.
24. The ophthalmic product of any one of embodiments 1 and 3 to 19 or the method of any one of embodiments 2 to 19, wherein the readily-usable silicone hydrogel contact lens comprises at least about 50 μg/lens of the polymeric surfactant.
25. The ophthalmic product of any one of embodiments 1 and 3 to 19 or the method of any one of embodiments 2 to 19, wherein the readily-usable silicone hydrogel contact lens comprises at least about 60 μg/lens of the polymeric surfactant.
26. The ophthalmic product of any one of embodiments 1 and 3 to 19 or the method of any one of embodiments 2 to 19, wherein the readily-usable silicone hydrogel contact lens comprises at least about 70 μg/lens of the polymeric surfactant.
27. The ophthalmic product of any one of embodiments 1 and 3 to 19 or the method of any one of embodiments 2 to 19, wherein the readily-usable silicone hydrogel contact lens comprises at least about 80 μg/lens of the polymeric surfactant.
28. The ophthalmic product of any one of embodiments 1 and 3 to 19 or the method of any one of embodiments 2 to 19, wherein the readily-usable silicone hydrogel contact lens comprises at least about 90 μg/lens of the polymeric surfactant.
29. The ophthalmic product of any one of embodiments 1 and 3 to 28 or the method of any one of embodiments 2 to 28, wherein the pre-autoclave packaging solution further comprises from about 0.1% to about 2% by weight of a hydrophilic polymer having a number average molecular weight of at least 100,000 Daltons.
30. The ophthalmic product of any one of embodiments 1 and 3 to 28 or the method of any one of embodiments 2 to 28, wherein the pre-autoclave packaging solution further comprises from about 0.1% to about 2% by weight of a hydrophilic polymer having a number average molecular weight of at least 200,000 Dalton.
31. The ophthalmic product or the method of embodiment 29 or 30, wherein the hydrophilic polymer is a polyvinylpyrrolidone.
32. The ophthalmic product or the method of embodiment 29 or 30, wherein the hydrophilic polymer is a copolymer of N-vinylpyrrolidone and at least one amino-containing vinylic monomer, wherein the amino-containing vinylic monomer is selected from the group consisting of alkylaminoalkylmethacrylate having 8-15 carbon atoms, alkylaminoalkylacrylate having 7-15 carbon atoms, dialkylaminoalkylmethacrylate having 8-20 carbon atoms, dialkylaminoalkylacrylate having 7-20 carbon atoms, and N-vinylalkylamide having 3-10 carbon atoms.
33. The ophthalmic product or the method of embodiment 31 or 32, wherein the amino-containing vinylic monomer is dimethylaminoethylmethacrylate or dimethylaminoethylacrylate.
34. The ophthalmic product of any one of embodiments 1 and 3 to 33 or the method of any one of embodiments 2 to 33, wherein the readily-usable silicone hydrogel contact lens has an oxygen permeability of from about 60 to about 180 barrers.
35. The ophthalmic product of any one of embodiments 1 and 3 to 33 or the method of any one of embodiments 2 to 33, wherein the readily-usable silicone hydrogel contact lens has an oxygen permeability of from about 70 to about 180 barrers.
36. The ophthalmic product of any one of embodiments 1 and 3 to 33 or the method of any one of embodiments 2 to 33, wherein the readily-usable silicone hydrogel contact lens has an oxygen permeability of from about 80 barrers to about 180 barrers.
37. The ophthalmic product of any one of embodiments 1 and 3 to 33 or the method of any one of embodiments 2 to 33, wherein the readily-usable silicone hydrogel contact lens has an oxygen permeability of from about 90 barrers to about 180 barrers.
38. The ophthalmic product of any one of embodiments 1 and 3 to 37 or the method of any one of embodiments 2 to 37, wherein the readily-usable silicone hydrogel contact lens has an equilibrium water content of from about 40% to about 80% by weight.
39. The ophthalmic product of any one of embodiments 1 and 3 to 37 or the method of any one of embodiments 2 to 37, wherein the readily-usable silicone hydrogel contact lens has an equilibrium water content of from about 45% to about 80% by weight.
40. The ophthalmic product of any one of embodiments 1 and 3 to 39 or the method of any one of embodiments 2 to 39, wherein the readily-usable silicone hydrogel contact lens has an elastic modulus of from 0.3 MPa to about 1.3 MPa.
41. The ophthalmic product of any one of embodiments 1 and 3 to 39 or the method of any one of embodiments 2 to 39, wherein the readily-usable silicone hydrogel contact lens has an elastic modulus of from about 0.4 MPa to about 1.2 MPa.
42. The ophthalmic product of any one of embodiments 1 and 3 to 41 or the method of any one of embodiments 2 to 41, wherein the pre-formed silicone hydrogel contact lens is an inherently wettable silicone hydrogel contact lens.
43. The ophthalmic product of any one of embodiments 1 and 3 to 42 or the method of any one of embodiments 2 to 42, wherein the pre-formed silicone hydrogel contact lens is composed of a silicone hydrogel material comprising repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.
44. The ophthalmic product or the method of embodiment 43, wherein said at least one silicone-containing vinylic monomer comprises a vinylic monomer of formula (M1) or (M2)

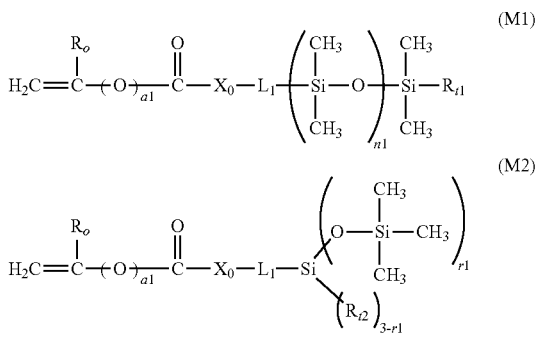

(M1)

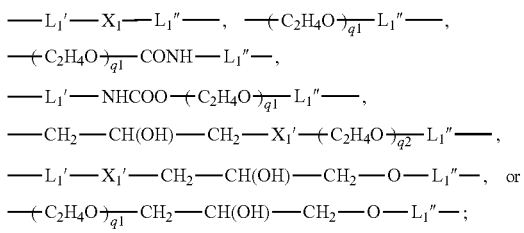

(M2)

in which: a1 is zero or 1; $R_o$ is H or methyl; $X_o$ is O or $NR_1$; $L_1$ is a $C_2$-$C_8$ alkylene divalent radical or a divalent radical of —$L_1'$—$X_1$—$L_1''$—,  —$(C_2H_4O)_{q1}$—$L_1''$—, —$(C_2H_4O)_{q1}$—CONH—$L_1''$—, —$L_1'$—NHCOO—$(C_2H_4O)_{q1}$—$L_1''$—, —$CH_2$—CH(OH)—$CH_2$—$X_1'$—$(C_2H_4O)_{q2}$—$L_1''$—, —$L_1'$—$X_1'$—$CH_2$—CH(OH)—$CH_2$—O—$L_1''$—, or —$(C_2H_4O)_{q1}$—$CH_2$—CH(OH)—$CH_2$—O—$L_1''$—;

$L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_0$ alkyl; $X_1'$ is O or $NR_1$; q1 is an integer of 1 to 30; q2 is an integer of 0 to 30; n1 is an integer of 3 to 40; and r1 is an integer of 2 or 3.

45. The ophthalmic product or the method of embodiment 43 or 44, wherein said at least one silicone-containing vinylic monomer comprises tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis (trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, N-[tris (trimethylsiloxy)-silylpropyl]-(meth)acrylamide, N-(2-hydroxy-3-(3-(bis(trimethylsilyloxy)methylsilyl)-propyloxy)propyl)-2-methyl (meth)acrylamide, N-(2-hydroxy-3-(3-(bis(trimethylsilyloxy)-methylsilyl) propyloxy)-propyl) (meth)acrylamide, N-(2-hydroxy-3-(3-(tris(trimethylsilyloxy)-silyl)propyloxy)propyl)-2-methyl acrylamide, N-(2-hydroxy-3-(3-(tris (trimethylsilyloxy)-silyl)propyloxy)propyl) (meth) acrylamide, N-[tris(dimethylpropylsiloxy)silylpropyl]-(meth)acrylamide, N-[tris(dimethylphenylsiloxy) silylpropyl] (meth)acrylamide, N-[tris (dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl) propyloxy)propyl] (meth)acrylamide, N,N-bis[2-hydroxy-3-(3-(tris(trimethylsilyloxy)silyl)propyloxy) propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxy-ethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, or a combination thereof.

46. The ophthalmic product or the method of any one of embodiments 43 to 45, wherein said at least one silicone-containing vinylic monomer comprises α-(meth)acryloxypropyl terminated w-$C_1$-$C_4$-alkyl terminated polydimethylsiloxane, α-(meth)acryloxy-2-hydroxypropyloxypropyl terminated ω—$C_1$-$C_4$-alkyl terminated polydimethylsiloxane, α-(2-hydroxyl-methacryloxypropyloxypropyl)-ω—$C_1$-$C_4$-alkyl-decamethyl-pentasiloxane, α-[3-(meth)acryloxyethoxy-2-hydroxypropyloxypropyl]-terminated ω—$C_1$-$C_4$-alkyl terminated polydimethylsiloxane, α-[3-(meth)acryloxy-propyloxy-2-hydroxypropyloxypropyl]-terminated ω—$C_1$-$C_4$-alkyl terminated polydimethylsiloxane, α-[3-(meth)acryloxy-isopropyloxy-2-hydroxypropyloxypropyl]-terminated ω—$C_1$-$C_4$-alkyl terminated polydimethylsiloxane, α-[3-(meth)acryloxybutyloxy-2-hydroxypropyloxypropyl]-terminated ω—$C_1$-$C_4$-alkyl terminated polydimethylsiloxane, α-[3-(meth)acryloxyethylamino-2-hydroxypropyloxypropyl]-terminated ω—$C_1$-$C_4$-alkyl terminated polydimethylsiloxane, α-[3-(meth)acryloxypropylamino-2-hydroxypropyloxypropyl]-terminated ω—$C_1$-$C_4$-alkyl terminated polydimethylsiloxane, α-[3-(meth)acryloxy-butylamino-2-hydroxypropyloxypropyl]-terminated ω—$C_1$-$C_4$-alkyl terminated polydimethylsiloxane, α-(meth)acryloxy(polyethylenoxy)-2-hydroxypropyloxypropyl]-terminated ω—$C_1$-$C_4$-alkyl terminated polydimethylsiloxane, α-[(meth)acryloxy-2-hydroxypropyloxy-ethoxypropyl]-terminated ω—$C_1$-$C_4$-alkyl terminated polydimethylsiloxane, α-[(meth)acryloxy-2-hydroxypropyl-N-ethylaminopropyl]-terminated ω—$C_1$-$C_4$-alkyl terminated polydimethylsiloxane, α-[(meth)acryloxy-2-hydroxypropyl-aminopropyl]-terminated ω—$C_1$-$C_4$-alkyl terminated polydimethylsiloxane, α-[(meth)acryloxy-2-hydroxypropyloxy-(polyethylenoxy)propyl]-terminated ω—$C_1$-$C_4$-alkyl terminated polydimethylsiloxane, α-(meth)acryloylamidopropyloxypropyl terminated ω—$C_1$-$C_4$-alkyl terminated polydimethylsiloxane, α-N-methyl-(meth)acryloylamidopropyloxypropyl terminated ω—$C_1$-$C_4$-alkyl terminated polydimethylsiloxane, α-[3-(meth)acrylamidoethoxy-2-hydroxypropyloxy-propyl]-terminated ω—$C_1$-$C_4$-alkyl polydimethylsiloxane, α-[3-(meth)acrylamidopropyloxy-2-hydroxypropyloxypropyl]-terminated ω—$C_1$-$C_4$-alkyl terminated polydimethylsiloxane, α-[3-(meth)acrylamidoisopropyloxy-2-hydroxypropyloxypropyl]-terminated ω—$C_1$-$C_4$-alkyl terminated polydimethylsiloxane, α-[3-(meth)acrylamidobutyloxy-2-hydroxypropyloxypropyl]-terminated ω—$C_1$-$C_4$-alkyl terminated polydimethylsiloxane, α-[3-(meth)acryloylamido-2-hydroxypropyloxypropyl] terminated w-$C_1$-$C_4$-alkyl polydimethylsiloxane, α-[3-[N-methyl-(meth)acryloylamido]-2-hydroxypropyloxypropyl] terminated ω—$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω—$C_1$-$C_4$-alkyl-terminated polydimethylsiloxanes, α-vinyl carbamate-terminated ω—$C_1$-$C_4$-alkyl-terminated polydimethylsiloxane, or a mixture thereof.

47. The ophthalmic product or the method of any one of embodiments 43 to 46, wherein the silicone hydrogel material comprises repeating units of at least one polysiloxane vinylic crosslinker.

48. The ophthalmic product or the method of embodiment 47, wherein said at least one polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha, omega-bis-3-aminopropyl-polydimethylsiloxane, or a combination thereof.

49. The ophthalmic product or the method of embodiment 47, wherein said at least one polysiloxane vinylic crosslinker comprises a vinylic crosslinker of formula (I)

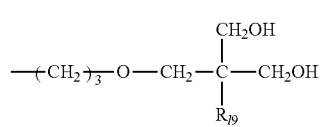
(Ic)

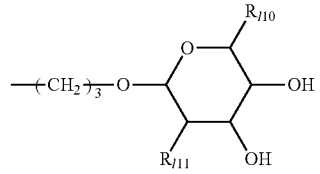
(Id)

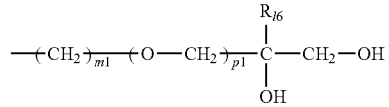
(Ie)

p1 is zero or 1; m1 is an integer of 2 to 4; m2 is an integer of 1 to 5; m3 is an integer of 3 to 6; m4 is an integer of 2 to 5;

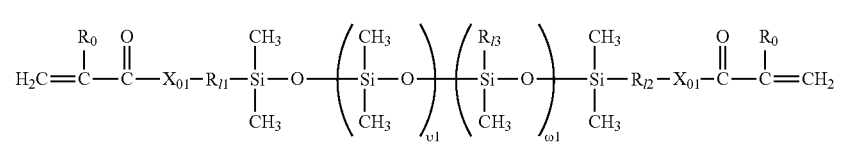
(I)

in which:

υ1 is an integer of from 30 to 500 and ω1 is an integer of from 1 to 75, provided that ω1/υ1 is from about 0.035 to about 0.15 (preferably from about 0.040 to about 0.12, even more preferably from about 0.045 to about 0.10);

$X_{01}$ is O or $NR_N$ in which $R_N$ is hydrogen or $C_1$-$C_{10}$-alkyl;

$R_o$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

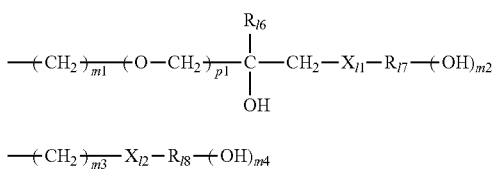
(Ia)

(Ib)

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_1$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_2$ is an amide linkage of

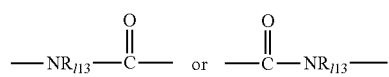

in which $R_{I13}$ is hydrogen or $C_1$-$C_{10}$ alkyl.

50. The ophthalmic product or the method of embodiment 47, wherein said at least one polysiloxane vinylic crosslinker comprises a vinylic crosslinker of any one of formula (1) to (7)

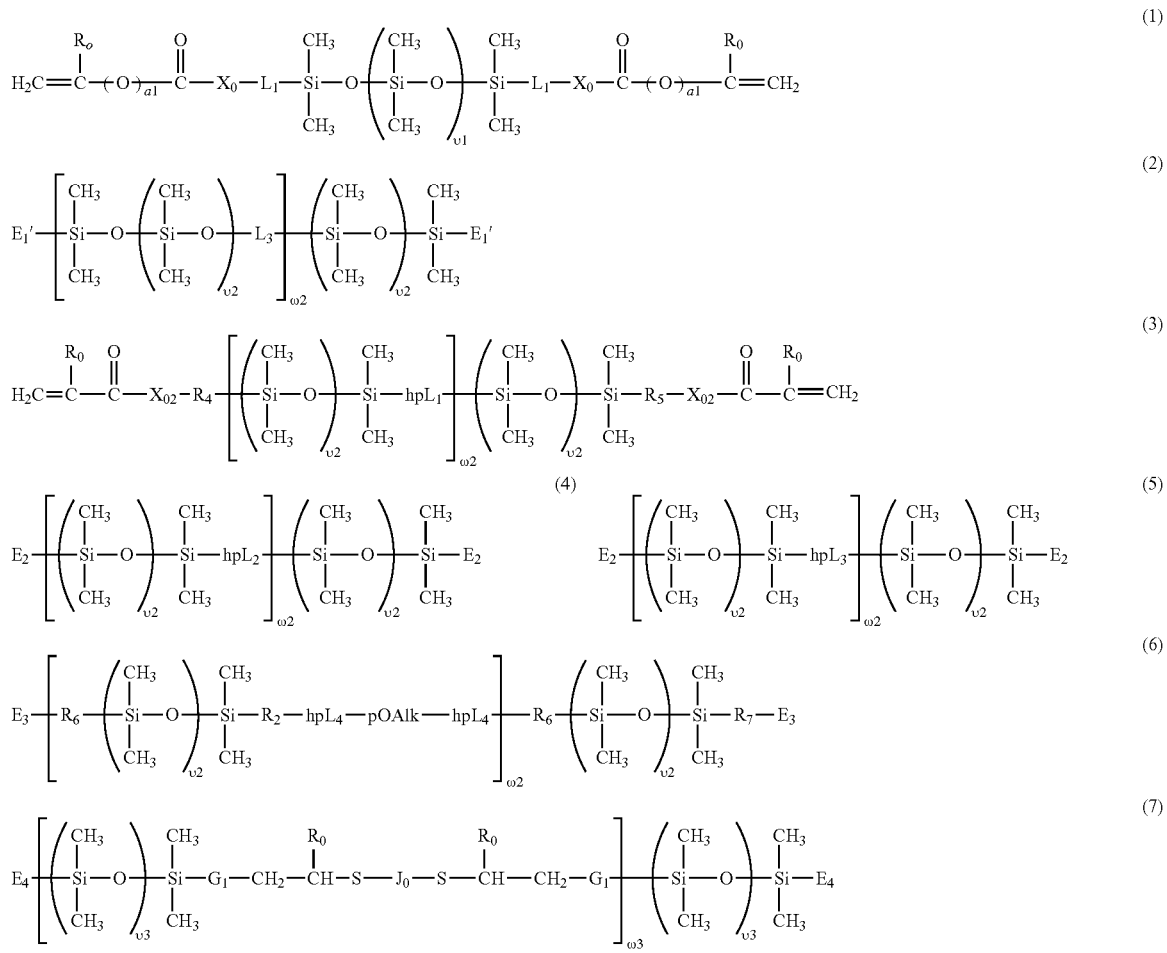

in which:
υ1 is an integer of from 30 to 500;
υ2 is an integer of from 5 to 50;
υ3 is an integer of from 5 to 100;
ω2 and ω3 independent of each other are an integer of from 1 to 15;
a1 and g1 independent of each other is zero or 1;
h1 is an integer of 1 to 20 and h2 is an integer of 0 to 20;
m1 and m3 independent of each other is 0 or 1, m2 is an integer of 1 to 6, m4 is an integer of 1 to 5, m5 is 2 or 3;
q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
x+y is an integer of from 10 to 30;
e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
$R_o$ is H or methyl;
$R_1$, $R_{1n}$, $R_{2n}$, $R_{3n}$, and $R_{4n}$ independent of one another are H or a $C_1$-$C_4$ alkyl having 0 to 2 hydroxyl group;
$R_{n5}$ is H or a $C_1$-$C_{10}$ alkyl;
$R_2$ is a $C_4$-$C_{14}$ hydrocarbon divalent radical;
$R_3$ is a $C_2$-$C_6$ alkylene divalent radical;
$R_4$ and $R_5$ independent of each other are a $C_1$-$C_6$ alkylene divalent radical or a $C_1$-$C_6$ alkylene-oxy-$C_1$-$C_6$ alkylene divalent radical;
$R_6$ and $R_7$ independent of each other are a $C_1$-$C_6$ alkylene divalent radical or a $C_1$-$C_6$ alkoxy-$C_1$-$C_6$ alkylene divalent radical;
$R_8$ and $R_9$ independent of each other are a substituted or unsubstituted $C_1$-$C_{12}$ alkylene divalent radical;
$X_o$, $X_1'$, $X_{o1}$, $X_{o2}$, and $X_{o3}$ independent of one another are O or $NR_1$;
$X_1$ is O, $NR_1$, NHCOO, OCONH, $CONR_1$, or $NR_1CO$;
$X_{o4}$ is —COO— or —$CONR_{n5}$—;
$X_{o5}$ and $X_{o7}$ independent of each other are a direct bond, —COO— or —$CONR_{n5}$—;
$X_{o6}$ is a direct bond, a $C_1$-$C_6$ alkylene divalent radical, a $C_1$-$C_6$ alkylenoxy divalent radical, —COO—, or —$CONR_{n5}$—;
$X_{o8}$ is a direct bond or —COO—;
$X_{o9}$ is O or $NR_{n5}$;
$X_{10}$ is a direct bond, a $C_1$-$C_6$ alkylene divalent radical, —COO—, or —$CONR_{n5}$—;
$E_1'$ is a monovalent radical of

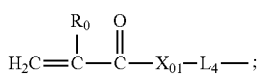

$E_2$ is a monovalent radical of

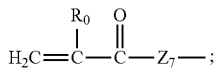

$E_3$ is a monovalent radical of

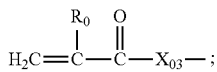

$E_4$ is a monovalent radical of

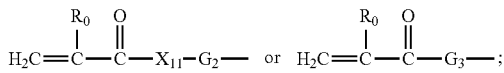

$L_1$ is a $C_2$-$C_8$ alkylene divalent radical or a divalent radical of -$L_1'$-$X^1$-$L_1''$-,

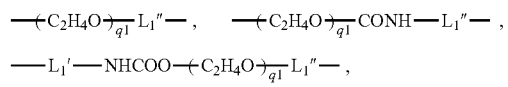

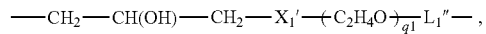

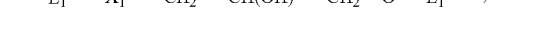

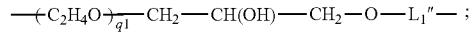

$L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_3$ is a divalent radical of

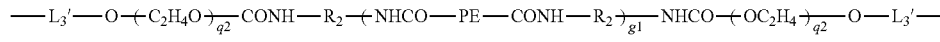

in which PE is a divalent radical of

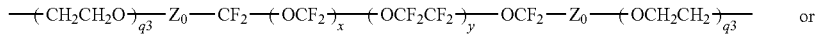

or

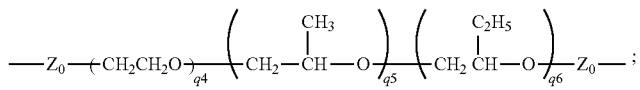

$L_3'$ is $C_3$-$C_8$ alkylene divalent radical;

$L_4$ is a divalent radical of

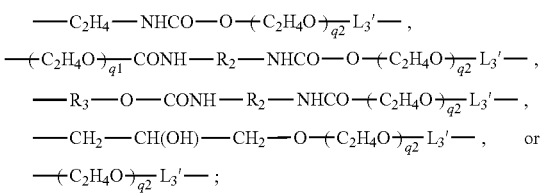

$hpL_1$ is a divalent radical of

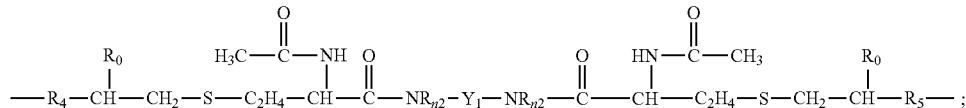

hpL$_2$ is a divalent radical of

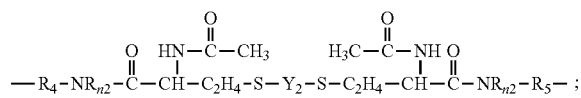

hpL$_3$ is a divalent radical of

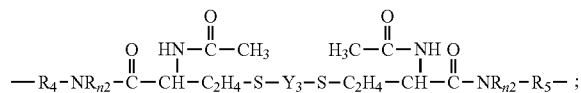

hpL$_4$ is a divalent radical of

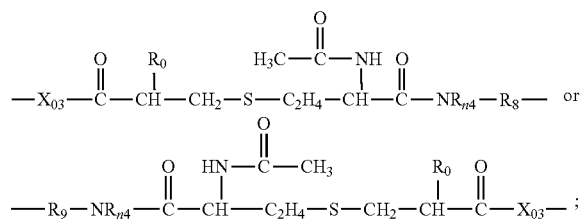

pOAlk is a divalent radical of

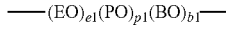

in which EO is an oxyethylene unit (—CH$_2$CH$_2$—), PO is an oxypropylene unit

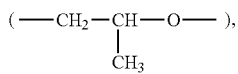

and BO is an oxybutylene unit

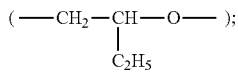

M$_0$ is C$_3$-C$_8$ alkylene divalent radical;
M$_1$ is a C$_4$-C$_{14}$ hydrocarbon divalent radical;
M$_2$ and M$_3$ independent of each other are a C$_1$-C$_6$ alkylene divalent radical;
J$_0$ is a C$_1$-C$_{12}$ hydrocarbon radical having 0 to 2 hydroxyl or carboxyl groups;
G1 is a direct bond, a C$_1$-C$_4$ alkylene divalent radical, or a bivalent radical of

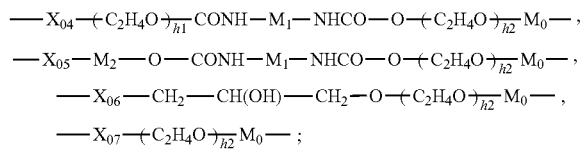

-continued

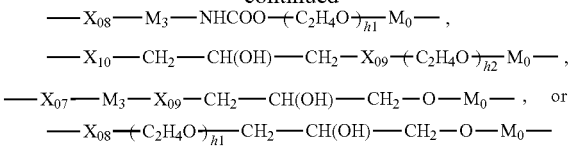

in which M$_o$ is linked to Si atom while X$_{04}$ to X$_{10}$ are linked to the group of —CH$_2$— in formula (7) and at least one of J$_0$ and G1 in formula (7) comprises at least one moieties selected from the group consisting of hydroxyl groups, urethane linkage of —OCONH—, amino groups of —NHR$^o$, amino linkages of —NH—, amide linkages of —CONH—, carboxyl groups, and combinations thereof; G$_2$ is a C$_1$-C$_4$ alkylene divalent radical or a bivalent radical of

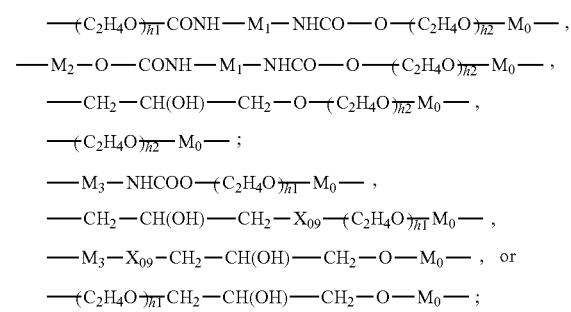

G$_3$ is a divalent radical of

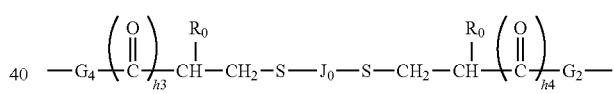

in which
h3 and h4 independent of each other are 1 or 0;
G4 is a divalent radical of any one of (a) —NR$_3$'— in which R$_3$' is hydrogen or C$_1$-C$_3$ alkyl, (b)

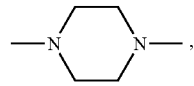

(c) —NR$_0$-G$_5$-NR$_0$— in which G$_5$ is a C$_1$-C$_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which G$_6$ is a C$_1$-C$_6$ alkylene divalent radical, a divalent radical of

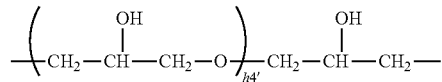

in which h4' is 1 or 2, a divalent radical of

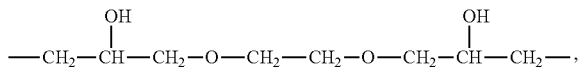

a divalent radical of

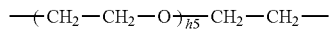

in which h5 is an integer of 1 to 5, a divalent radical of

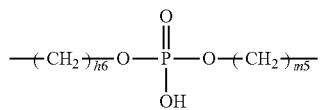

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

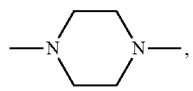

or a divalent radical of

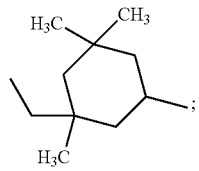

$Y_2$ is a divalent radical of

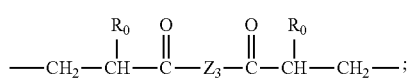

$Y_3$ is a divalent radical of

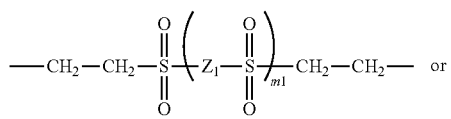

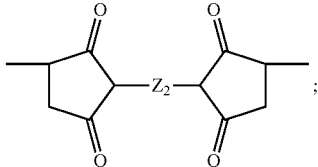

$Z_0$ is a direct bond or a $C_1$-$C_{12}$ alkylene divalent radical;

$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical, $Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical, $Z_3$ is a divalent radical of any one of (a) —$NR_{n3}$—, (b)

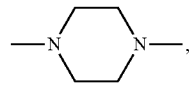

(c) —$NR_0$—$Z_5$—$NR_0$—, and (d) —O—$Z_6$—O—, $Z_4$ is a $C_1$-$C_6$ alkylene divalent radical, $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, $Z_6$ is (a) a $C_1$-$C_6$ alkylene divalent radical, (b) a divalent radical of

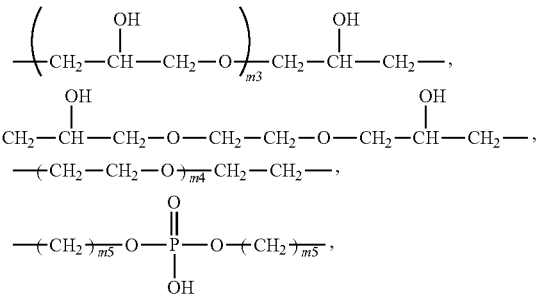

or (c) a substituted $C_3$-$C_8$ alkylene divalent radical having a hydroxyl group or phosphonyloxy group, $Z_7$ is a divalent radical of

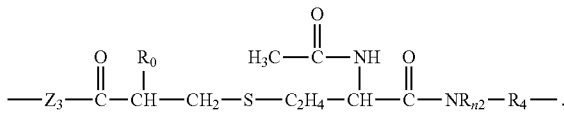

51. The ophthalmic product or the method of embodiment 47, wherein said at least one polysiloxane vinylic crosslinker is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethyl-amino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

52. The ophthalmic product or the method of any one of embodiments 43 to 51, wherein the silicone hydrogel material comprises repeating units of at least one hydrophilic vinylic monomer.

53. The ophthalmic product or the method of embodiment 52, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth) acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth) acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth) acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth) acrylate, trimethylammonium 2-hydroxy propyl (meth) acrylate hydrochloride, dimethylaminoethyl (meth) acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly (ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2-(trimethylammonio)ethylphosphate, 2-[(meth)acryloylamino]ethyl-2'(trimethylammonio)-ethylphosphate, 3-[(meth)acryloylamino]propyl-2'-(trimethylammonio)ethylphosphate, 4-[(meth)acryloylamino]butyl-2-(trimethylammonio) ethylphosphate, 5-((meth)acryloyloxy)pentyl-2-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylamrnonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2-(trimethylammonio)ethylphosphate, 2-((meth)acryloyloxy)hexyl-2'(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2' (trimethylammonio)ethylphosphate, 2-(allyloxycarbonylamino)ethyl-2'-(trimethylammonio)ethyl ethylphosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

54. The ophthalmic product or the method of embodiment 52 or 53, wherein said at least one hydrophilic vinylic monomer comprises N-vinylpyrrolidone, N-vinyl-N-methyl acetamide, or combinations thereof.

55. The ophthalmic product or the method of any one of embodiments 52 to 54, wherein said at least one hydrophilic vinylic monomer comprises N,N-dimethyl (meth)acrylamide.

56. The ophthalmic product or the method of any one of embodiments 52 to 55, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth) acrylate having a number average molecular weight of up to 1500, poly(ethylene glycol)ethyl (meth)acrylamide having a number average molecular weight of up to 1500, or combinations thereof.

57. The ophthalmic product or the method of any one of embodiments 43 to 56, wherein the silicone hydrogel material comprises repeating units of at least one non-silicone vinylic cross-linking agent.

58. The ophthalmic product or the method of embodiment 57, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth) acryloyl-N-ethylamine, N,N'-methylene bis(meth) acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis (meth)acrylamide, N,N'-2,3-dihydroxybutylene bis(meth) acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

59. The ophthalmic product or the method of any one of embodiments 43 to 58, wherein the silicone hydrogel material comprises repeating units of at least one blending vinylic monomer.

60. The ophthalmic product or the method of any one of embodiments 43 to 58, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

61. The ophthalmic product or the method of any one of embodiments 43 to 58, wherein said at least one blending vinylic monomer comprises methyl methacrylate.

62. The ophthalmic product or the method of any one of embodiments 43 to 61, wherein the silicone hydrogel material comprises repeating units of at least one UV-absorbing vinylic monomer and/or repeating units of at least one UV/HEVL-Absorbing vinylic monomer.

63. The ophthalmic product or the method of any one of embodiments 43 to 61, wherein the silicone hydrogel material comprises repeating units of 2-[2'-hydroxy-5'-(2-methacryloxyethyl)phenyl)]-2H-benzotriazole (Norbloc), and repeating units of at least one UV/HEVL absorbing vinylic monomer which is 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxy-propoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), or combinations thereof.

64. The ophthalmic product or the method of any one of embodiments 1 and 3 to 63 or the method of any one of embodiments 3 to 63, wherein the readily-usable silicone hydrogel contact lens has a UVB transmittance of about 10% or less between 280 and 315 nanometers, a UVA transmittance of about 30% or less between 315 and 380 nanometers, and a Violet transmittance of about 70% or less, preferably about 60% or less, more preferably about 50% or less, even more preferably about 40% or less) between 380 nm and 440 nm.

65. The ophthalmic product or the method of embodiment 64, wherein the readily-usable silicone hydrogel contact lens has a UVB transmittance of about 5% or less between 280 and 315 nanometers.

66. The ophthalmic product or the method of embodiment 63, wherein the readily-usable silicone hydrogel contact lens has a UVB transmittance of about 2.5% or less between 280 and 315 nanometers.

67. The ophthalmic product or the method of embodiment 64, wherein the readily-usable silicone hydrogel contact lens has a UVB transmittance of about 1% or less between 280 and 315 nanometers.

68. The ophthalmic product or the method of any one of embodiments 64 to 67, wherein the readily-usable silicone hydrogel contact lens has a UVA transmittance of about 20% or less between 315 and 380 nanometers.

69. The ophthalmic product or the method of any one of embodiments 64 to 67, wherein the readily-usable silicone hydrogel contact lens has a UVA transmittance of about 10% or less between 315 and 380 nanometers.

70. The ophthalmic product or the method of any one of embodiments 64 to 67, wherein the readily-usable silicone hydrogel contact lens has a UVA transmittance of about 5% or less between 315 and 380 nanometers.

71. The ophthalmic product or the method of any one of embodiments 64 to 67, wherein the readily-usable silicone hydrogel contact lens has a Violet transmittance of about 60% or less between 380 nm and 440 nm.

72. The ophthalmic product or the method of any one of embodiments 64 to 67, wherein the readily-usable silicone hydrogel contact lens has a Violet transmittance of about 50% or less between 380 nm and 440 nm.

73. The ophthalmic product or the method of any one of embodiments 64 to 67, wherein the readily-usable silicone hydrogel contact lens has a Violet transmittance of about 40% or less between 380 nm and 440 nm.

74. The ophthalmic product of any one of embodiments 1 and 3 to 73 or the method of any one of embodiments 2 to 73, wherein the static water contact angle of the readily-usable silicone hydrogel contact lens directly out of the sealed and autoclave-sterilized package is at least 10 degrees lower than the static water contact angle of the pre-formed silicone hydrogel contact lens.

75. The ophthalmic product of any one of embodiments 1 and 3 to 73 or the method of any one of embodiments 2 to 73, wherein the static water contact angle of the readily-usable silicone hydrogel contact lens directly out of the sealed and autoclave-sterilized package is at least 15 degrees lower than the static water contact angle of the pre-formed silicone hydrogel contact lens.

76. The ophthalmic product of any one of embodiments 1 and 3 to 73 or the method of any one of embodiments 2 to 73, wherein the static water contact angle of the readily-usable silicone hydrogel contact lens directly out of the sealed and autoclave-sterilized package is at least 20 degrees lower than the static water contact angle of the pre-formed silicone hydrogel contact lens.

77. The ophthalmic product of any one of embodiments 1 and 3 to 76 or the method of any one of embodiments 2 to 76, wherein the polymeric surfactant is present in the pre-autoclave packaging solution in an amount selected to ensure that difference in lens diameter between the readily-usable SiHy contact lens and control lens that is the preformed SiHy contact lens autoclaved in phosphate buffered saline free of the polymeric surfactant is less than about 0.20 mm.

78. The ophthalmic product of any one of embodiments 1 and 3 to 76 or the method of any one of embodiments 2 to 76, wherein the polymeric surfactant is present in the pre-autoclave packaging solution in an amount selected to ensure that difference in lens diameter between the readily-usable SiHy contact lens and control lens that is the preformed SiHy contact lens autoclaved in phosphate buffered saline free of the polymeric surfactant is less than about 0.17 mm.

79. The ophthalmic product of any one of embodiments 1 and 3 to 76 or the method of any one of embodiments 2 to 76, wherein the polymeric surfactant is present in the pre-autoclave packaging solution in an amount selected to ensure that difference in lens diameter between the readily-usable SiHy contact lens and control lens that is the preformed SiHy contact lens autoclaved in phosphate buffered saline free of the polymeric surfactant is less than about 0.15 mm.

80. The ophthalmic product of any one of embodiments 1 and 3 to 76 or the method of any one of embodiments 2 to 76, wherein the polymeric surfactant is present in the pre-autoclave packaging solution in an amount selected to ensure that difference in lens diameter between the readily-usable SiHy contact lens and control lens that is the preformed SiHy contact lens autoclaved in phosphate buffered saline free of the polymeric surfactant is less than about 0.12 mm.

81. The method of any one of embodiments 2 to 80 or the ophthalmic product of any one of embodiments 1 and 3 to 80, wherein the pre-autoclave packaging solution comprises from about 0.005% to about 0.038% by weight of the polymeric surfactant.

82. The method of any one of embodiments 2 to 80 or the ophthalmic product of any one of embodiments 1 and 3 to 80, wherein the pre-autoclave packaging solution comprises from about 0.007% to about 0.036% by weight of the polymeric surfactant.

83. The method of any one of embodiments 2 to 80 or the ophthalmic product of any one of embodiments 1 and 3 to 80, wherein the pre-autoclave packaging solution comprises from about 0.008% to 0.034% by weight of the polymeric surfactant.

84. The method of any one of embodiments 2 to 80 or the ophthalmic product of any one of embodiments 1 and 3 to 80, wherein the pre-autoclave packaging solution comprises from about 0.009% to 0.032% by weight of the polymeric surfactant.

85. The method of any one of embodiments 2 to 80 or the ophthalmic product of any one of embodiments 1 and 3 to 80, wherein the pre-autoclave packaging solution comprises from about 0.010% to 0.030% by weight of the polymeric surfactant.

86. The method of any one of embodiments 2 to 85 or the ophthalmic product of any one of embodiments 1 and 3 to 85, wherein the sealed package containing the pre-formed silicone hydrogel contact lens therein is autoclaved for at least about 45 minutes.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk t), the intrinsic (or edge-corrected) oxygen permeability ($Dk_i$ or $Dk_c$) of a lens and a lens material are determined according to procedures described in ISO 18369-4.

Surface Wettability Tests.

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle on the anterior surface of a contact lens. The measurements are performed on fully hydrated contact lenses and immediately after blot-drying. The blot-dried lens is then mounted on the contact angle measurement pedestal with the anterior surface up, and the sessile drop contact angle is automatically measured using the software provided by the manufacturer. The deionized water (ultra pure) used for measuring the water contact angle has a resistivity >18M Ωcm and the droplet volume used is 2 μl. The tweezers and the pedestal are washed well with Isopropanol and rinsed with DI water before coming in contact with the contact lenses. Each static water contact angle is the average of the left and right water contact angles. The static water contact angle in reference to a contact lens is an average water contact angle obtained by averaging the static water contact angles measured with at least 5 contact lenses.

Water Break-Up Time (WBUT) Tests

The surface hydrophilicity of lenses (after autoclave) is assessed by determining the time required for the water film to start breaking on the lens surface. Lenses exhibiting WBUT≥5 seconds are considered to have a hydrophilic surface and are expected to exhibit adequate wettability (ability to support the tear film) on-eye.

Lenses are prepared for water breakup measurement by removing the lens from its blister (or container) with soft plastic tweezers (Menicon) and placing the lens in a beaker containing phosphate buffered saline. The beaker contains at least 20 mL phosphate buffered saline per lens, with up to 3 lenses per beaker. Lenses are soaked for a minimum 30 minutes up to 24 hours before being transferred with soft plastic tweezers into a 96 well plastic tray with fresh phosphate buffered saline.

Water breakup time is measured at room temperature as follows: lenses are picked up with soft plastic tweezers as close to the edge of the lens as possible, base curve toward the measurer, taking care that the lens does not touch the sides of the well after being removed from the saline. As illustrated schematically in FIG. 1, the lens (101) is shaken once to remove excess saline and a timer is started. Ideally, the water film (120) in the base curve surface of the lens will recede from the point of contact with the tweezers's tips (111) in a uniform, circular pattern (125). When approximately 30% of the hydrated area (125) has receded, the timer is stopped and this time is recorded as the water breakup time (WBUT). Lenses that do not display the ideal receding pattern can be placed back in the tray and re-measured, after rehydrating for at least 30 seconds.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. Transmittance is calculated using the following equations:

UVA % $T$=Average % Transmission between 315 nm and 380 nm×100

UVB % $T$=Average % Transmission between 280 nm and 315 nm×100

Violet % $T$=Average % Transmission between 380 nm and 440 nm×100.

Determination of Diameter of Hydrated Contact Lens

Figure 2:
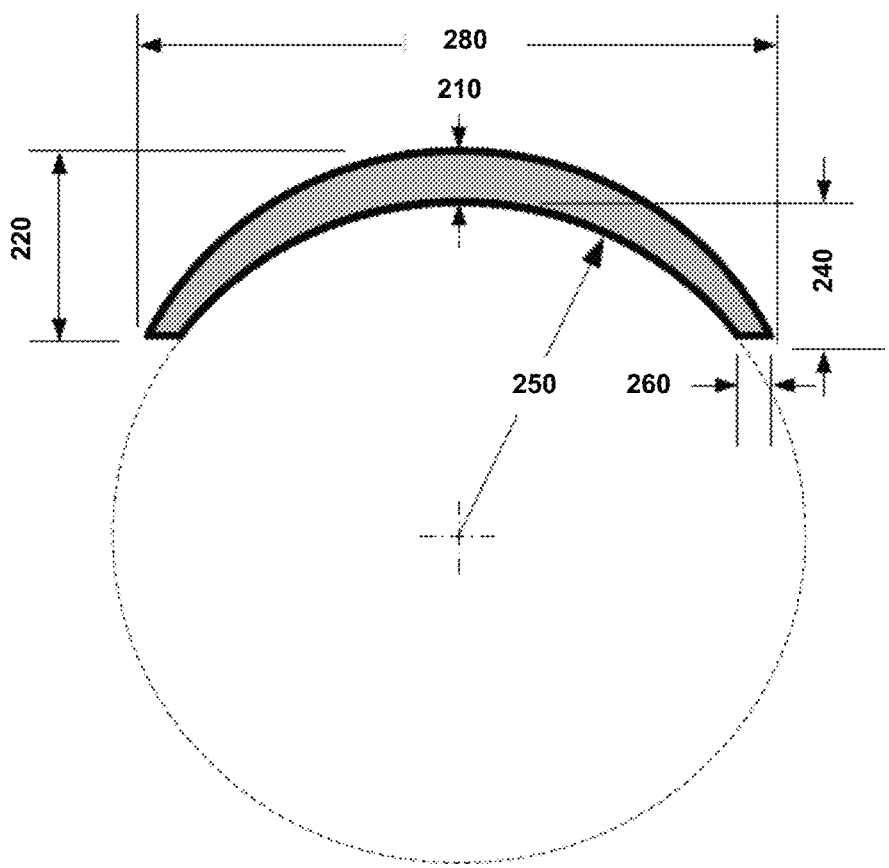
FIG. 2 illustrates the general dimensions of a contact lens.

FIG. 2 shows schematically the general lens dimensions which are typically determined by a contact lens manufacturer. The general dimensions include center thickness (CT) (210), anterior sagittal height (ASag) (220), posterior sagittal height (PSag) (240), base curve equivalent (BCE) (250), edge thickness (ET) (260), and diameter (280). Measurements of the general lens dimensions can be carried out on fully hydrated contact lenses in a wetcell by using a low coherence interferometer similar to that described by Heidemana and Greivenkampin in their paper (Optical Engineering 55(3), 034106 (March 2016)).

For measurements, a contact lens is seated on the flate bottom surface of the wetcell which is filled with a phosphate buffered saline and a low coherence interferometer is placed at the geometric center of the lens using a motion controller. The interferometer measures thicknesses of material based off of reflections between different material surfaces. The center of the lens is determined by the measurement by the camera.

The diameter is defined as the outermost edge of the lens viewed from above the lens. The edge points are fit to an ellipse and the diameter is calculated as the average of the major and minor ellipse diameters. Typically, contact lenses have highly circular diameters and either a circular or elliptical fitting will result in similar values. However, if a lens is slightly out of round, an ellipse more accurately describes the shape of the contact lens diameter than a circle. The lens diameters of 3 to 10 contact lenses from one single batch of contact lenses are measured and averaged to obtain the averaged lens diameter for that batch of contact lenses.

7 Cycles of Simulated 1-Day-Wearing Extraction

Seven cycles of simulated 1-day-wearing extraction (S1DW extraction) is carried out as follows. In the $1^{st}$ cycle of S1DW extraction, one to three readily-usable SiHy contact lenses are taken out from sealed packages and blotted; all the blotted readily-usable SiHy contact lenses are soaked together in 1.0 mL of fresh phosphate buffered saline (PBS) as extraction medium in one vial which is kept while shaking in a water bath at 35° C. for 24 hours; and then all the PBS used in the $1^{st}$ cycle of S1DW extraction is pippeted out of the vial and saved for later UPLC (ultra performance liquid chromatography) analysis. In the $2^{nd}$ to $7^{th}$ cycles of S1DW extraction, 1.0 mL of free PBS as extraction medium is added into the vial containing the readily usable SiHy contact lenses which have been subjected to the proceeding cycle of S1DW extraction; the readily-usable SiHy contact lenses are soaked together in the added 1.0 mL of the fresh PBS in the vial which is kept while shaking in the water bath at 35° C. for 24 hours; and then all the PBS used in current cycle of S1DW extraction is pippeted out of the vial and saved for later UPLC analysis.

Chemicals

The following abbreviations are used in the following examples: TFA represents trifluoroacetic acid; UPW represents ultra pure water having a resistivity >18M Ωcm; UPLC represents ultra performance liquid chromatography; NVP represents N-vinylpyrrolidone; MMA represents methyl methacrylate; TEGDMA represent triethyleneglycol dimethacrylate; VAZO 64 represents 2,2'-dimethyl-2,2'azo-dipropiononitrile; Nobloc is 2-[3-(2H-Benzotriazol-2-yl)-4-hydroxyphenyl]ethyl methacrylate from Aldrich; UV28 represents 2-{2'-Hydroxy-3'-tert-butyl-5'-[3'-methacryloyloxypropoxy]phenyl}-5-chloro-2H-benzotriazole; RB247 is Reactive Blue 247; TAA represents tert-amyl alcohol; PrOH represents 1-propanol; IPA represents isopropanol; PBS represents a phosphate-buffered saline which has a pH of 7.2±0.2 at 25° C. and contains about 0.077 wt. % $NaH_2PO_4.H_2O$, about 0.31 wt. % $Na_2HPO_4.2H_2O$, and about 0.77 wt. % NaCl and; wt. % represents weight percent; D9 represents monobutyl-terminated monomethacryloxypropyl-terminated polydimethylsiloxane (Mw~984 g/mol from Shin-Etsu); "G4" macromer represents a di-methacryloyloxypropyl-terminated polysiloxane (Mn~13.5K g/mol, OH content ~1.8 meq/g) of formula (A).

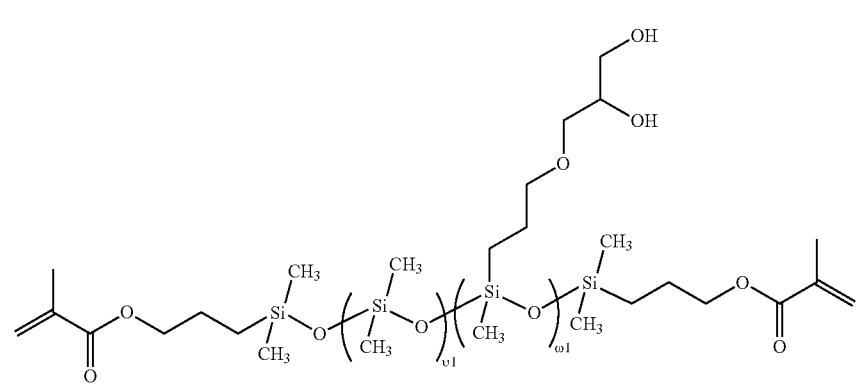

(A)

Example 2

Preparation of Polymerizable Compositions

Lens formulations (polymerizable compositions), I to IV, are prepared to have compositions (in unit parts) as shown in Table 1.

TABLE 1

|  | Formulation I | Formulation II | Formulation III | Formulation IV |
|---|---|---|---|---|
| D9 | 33 | 33 | 33 | 33 |
| G4 | 10 | 10 | 10 | 10 |
| NVP | 46 | 46 | 46 | 46 |
| MMA | 10 | 10 | 10 | 10 |
| TEGDMA | 0.2 | 0.2 | 0.2 | 0.65 |
| Norbloc | 1.5 | 1.5 | 1.8 | 1.5 |
| UV28 | 0.26 | 0.26 | 0 | 0.4 |
| VAZO 64 | 0.5 | 0.5 | 0.5 | 0.5 |
| RB247 | 0.01 | 0.01 | 0.01 | 0.01 |
| TAA | 10 | 10 | 10 | 10 |
| Curing | 55/80/100° C. | 55/80/100° C. | 55/80/100° C. | 55/80/100° C. |
| Profile | 30 min/2 hr/30 min | 40 min/40 min/40 min | 30 min/120 min/30 min | 30 min/120 min/30 min |

The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter.

Cast-Molded SiHy Contact Lenses

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold. The dry state lens is loaded in a designed extraction tray. Alternatively, lenses can be removed from the base curve mold halves by floating off (i.e., soaking in an organic solvent, e.g., IPA, without ultrasonic).

After de-molding, cast-molded SiHy contact lenses are extracted with PrOH for 180 minutes for lens extraction, rinsed in water (55/45) for about 25 minutes, rinsed with PB (phosphate buffer containing about 0.077 wt. % $NaH_2PO_4$—$H_2O$ and about 0.31 wt. % $Na_2HPO_4 2H_2O$) for about 50-60 minutes, and then are packaged/sealed in polypropylene (PP) lens packaging shells (blisters) with 0.65 mL of a packaging solution as described in the following examples. The sealed lens packages are autoclaved at about 121° C. for about 45 minutes. The resultant SiHy contact lenses are characterized according to the procedures to have the following properties: Dkc~105 barrers-118 barrers; EWC~54%-57%; elastic modulus ~0.45 MPa-0.62 MPa; WBUT~23 seconds to 40 seconds; water contact angle by captive bubble ~47°-52°, a friction rating of about 2.0.

In the subsequent examples, SiHy contact lenses prepared from formulation IV are used unless otherwise specified.

Example 3

Preparations of Packaging Solutions

Copolymer 845 is a copolymer of N-vinylpyrolidone and dimethylaminoethyl methacrylate ($M_w$~700,000-1,200,000 g/mol by GPC relative to polyethylene oxide standards, $M_w/M_n$~5.7-8.5) and is obtained from ISP.

A PEO-PBO block copolymer ("$EO_{45}BO_{10}$") of formula (S2), in which R is methyl, m has an average value of 45; and n has an average value of 10, is prepared according to the procedures described in U.S. Pat. No. 8,318,144. This polymeric surfactant has a HLB of about 14.7, calculated based on the formula of $$HLB = 100 \times \frac{w_{EO}}{w_{EO_{45}BO_{10}}} \times \frac{1}{5}$$

in which $W_{EO}$ is the total weight of hydrophilic poly(oxyethylene) portion in the copolymer $EO_{45}BO_{10}$ and $W_{EO_{45}BO_{10}}$ is the molecular weight of the copolymer $EO_{45}BO_{10}$.

Four packaging solutions are prepared by dissolving various components in 1 L of water as shown in Table 2. The concentrations are weight percent.

TABLE 2

| | Pakaging Solution No. | | | |
|---|---|---|---|---|
| | I | II | III | IV |
| NaCl (% by weight) | 0.77 | 0.77 | 0.77 | 0.77 |
| $NaH_2PO_4 \cdot H_2O$ (% by weight) | 0.076 | 0.076 | 0.076 | 0.076 |
| $Na_2HPO_4 \cdot 7H_2O$ (% by weight) | 0.47 | 0.47 | 0.47 | 0.47 |
| Copolymer 845 (% by weight) | 0 | 1.0 | 0 | 1.0 |
| $CH_3O(EO)_{45}(BO)_{10}$ | 0 | 0 | 0.015 | 0.015 |

Lens Packaging

SiHy contact lenses prepared in Example 2 are individually packaged and sealed in PP blister packages each containing 0.65 mL of a packaging solution (one of Packaging solutions I to IV prepared above). The sealed lens packages are autoclaved at about 121° C. for 45 minutes.

Wettabilities of Readily-Usable SiHy Contact Lenses

The static water contact angles ($WCA_{OOP}$) of readily-usable SiHy contact lenses directly out of the packages after being stored at room temperature for about 12 months are determined according to the procedures described in Example 1. The results are reported in Table 3.

TABLE 3

| | Packaging Solution No. | | | |
|---|---|---|---|---|
| | I | II | III | IV |
| $WCA_{OOP}$ (degrees) | 75 ± 5 | 67 ± 3 | 42 ± 5 | 36 ± 3 |

Table 3 shows that the wettability of readily-usable SiHy lenses, which have been packaged and autoclaved in a packaging solution contains a polymeric surfactant ($EO_4BO_{10}$) and have been stored at room temperature for about 12 months, is significantly improved over that of readily-usable SiHy lenses packaged in a packaging solution free of $EO_{45}BO_{10}$ (Packaging solution I as control) (i.e., corresponding to the original pre-formed SiHy contact lens), and that the combination of $EO_{45}BO_{10}$ with a high molecular weight hydrophilic polymer (Copolymer-845) can have some synergy to lower the water contact angles (i.e., improving the wettability) of readily-usable SiHy lenses packaged in a packaging solution containing a mixture of $EO_{45}BO_{10}$ and Copolymer-845, even though Copolymer-845 alone can improve slightly the wettability of readily-usable SiHy lenses packaged in a packaging solution containing Copolymer-845.

Example 4

The duration of the availability of the polymeric surfactant in the readily-usable SiHy contact lens is estimated by using fluorescently tagged polymeric surfactant (NBD-labeled $EO_{45}BO_{10}$, in which NBD is nitrobenzoxadiazole and $EO_{45}BO_{10}$ is a PEO-PBO block copolymer of formula (S2), in which R is methyl, m has an average value of 45; and n has an average value of 10 (designated as $EO_{45}BO_{10}$). The fluorescent tag (NBD) enables confocal visualization of the polymeric surfactant within the contact lens and demonstrates that the polymeric surfactant is still present after 7 cycles of simulated 1-day-wearing&cleaning extraction (i.e., mimicking 7 days of daily wear and cleaning routine).

Synthesis of NBD-$EO_{45}BO_{10}$

NBD-$EO_{45}BO_{10}$ is prepared according to the following scheme.

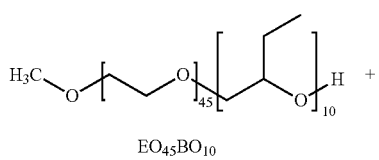

$EO_{45}BO_{10}$

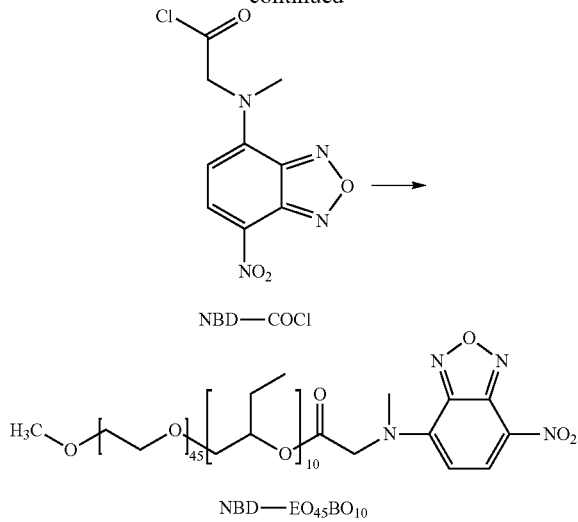

NBD—COCl

NBD—$EO_{45}BO_{10}$ 100 mg of NBD-COCl (4-(N-Chloroformylmethyl-N-methylamino)-7-nitro-2,1,3-benzoxadiazole) is dissolved in 0.5 mL of Hexane and 2.5 mL of methylene chloride. Then ~1 g of $EO_{45}BO_{10}$ (Mn~3000 g/mol) and 0.7 g dry $K_2CO_3$ are added. The reaction is performed under $N_2$ for more than 48 h at room temperature. $K_2CO$ is centrifuged, and solvent is evaporated. The purification of the NBD-$EO_{45}BO_{10}$ is using dialysis or SEC column. Further purification by HPLC column fraction collection is performed to obtain high purity NBD-$EO_{45}BO_{10}$ (99.5 wt %) This NBD-labeled polymeric surfactant has a HLB of about 13.4, calculated based on the formula of $$HLB = 100 \times \frac{w_{EO}}{w_{NBD\text{-}EO_{45}BO_{10}}} \times \frac{1}{5}$$

in which $W_{EO}$ is the total weight of hydrophilic poly(oxyethylene) in the copolymer $EO_{45}BO_{10}$ and $W_{NBD\text{-}EO_{45}BO_{10}}$ is the molecular weight of the NBD-labeled copolymer NBD-$EO_{45}BO_{10}$.

Preparation of Packaging Solution

A packaging solution is prepared by dissolving the purified NBD-$EO_{45}BO_{10}$ prepared above, Copolymer 845, and other required components in water to have the following composition: 150 ppm NBD-$EO_{45}BO_{10}$, 1% by weight of copolymer 845, 0.77% by weight of NaCl, 0.076% by weight of $NaH_2PO_4$—$H_2O$, and 0.47% by weight of $Na_2HPO_4$-$7H_2O$.

Lens Packaging

SiHy contact lenses prepared according to the procedures described in Example 2 are individually packaged and sealed in PP blister packages each containing 0.65 mL of the prepared packaging solution. The sealed lens packages are autoclaved at about 121° C. for 45 minutes.

Uptake of NBD-$EO_{45}BO_{10}$

The concentrations of NBD-$EO_{45}BO_{10}$ in the packaging solution before and after autoclave are measured by HPLC method.

The analysis of NBD-$EO_{45}BO_{10}$ in the packaging solution is carried out using a reversed-phase Waters UPLC system attached with Florescence detector and with UPLC columns of 150×2.1 mm diameter, 1.9 μm particle size (e.g., ThermoScientific Hypersil GOLD or the like).

The mobile phase is prepared as a mixture of Mobile phase: A—50:30:19.8:0.2 (v/v) methanol/acetonitrile/water/formic acid and Mobile phase: B—59.8:40:0.2 (v/v) methanol/acetone/formic acid. The mobile phase is filtered on 0.45 µm nylon filter. The flow rate is 0.3 mL per minutes. Column temperature is set at 60° C. with run time 30 minutes. Florescent NBD-EO$_{45}$BO$_{10}$ (Excitation λ=460 nm; Emission λ=510 nm) is detected at range of retention time (RT) 4 minutes to RT 12 min.

The amount of NBD-EO$_{45}$BO$_{10}$ uptaken into the readily-usable SiHy contact lens is calculated by ($C_{before\ autoclave}$−$C_{after\ autoclave}$)*0.65 mL. Five readily-usable lenses are used to obtain an averaged amount of NBD-EO$_{45}$BO$_{10}$ uptaken by a readily-usable SiHy contact lens. The uptake amount of NBD-EO$_{45}$BO$_{10}$ is determined to be about 100 µg/lens.

Also the amount of NBD-EO$_{45}$BO$_{10}$ uptaken by a readily-usable SiHy contact lens can be determined by extracting it completely with an acetone/hexane 1:1 mixture as extraction medium and determining the amount of the NBD-EO$_{45}$BO$_{10}$ in the extraction medium. Similarly, five readily-usable lenses are used to obtain an averaged amount of NBD-EO$_{45}$BO$_{10}$, uptaken by a readily-usable SiHy contact lens.

Visualization of Uptake of NBD-EO$_{45}$BO$_{10}$

NBD-EO$_{45}$BO$_{10}$ uptaken into the readily-usable SiHy contact lens is visualized by confocal microscope. As control, SiHy contact lenses immersed in the packaging solution without under going the autoclave step are also studied by confocal microscope. It is noted that when examining SiHy contact lenses autoclaved in a PBS (free of NBD-EO$_{45}$BO$_{10}$), there is no fluorescence, which serves as a baseline fluorescence.

Figure 3A:
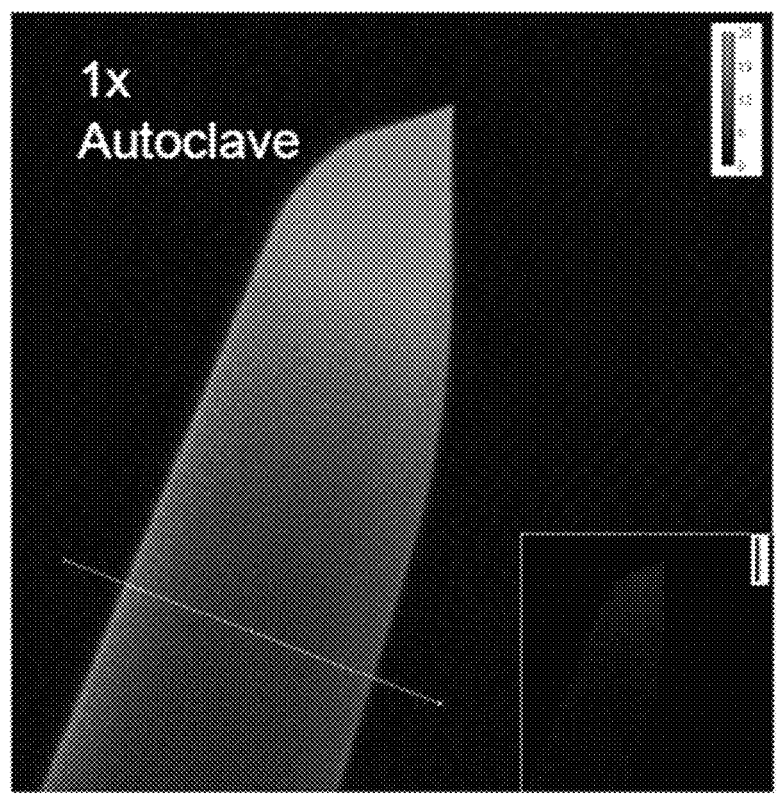
FIG. 3A shows the Fluorescent image of a cross-section of a readily-usable SiHy lens packaged and autoclaved in a package solution containing a polymeric surfactant according to a preferred embodiment of the invention.
Figure 3B:
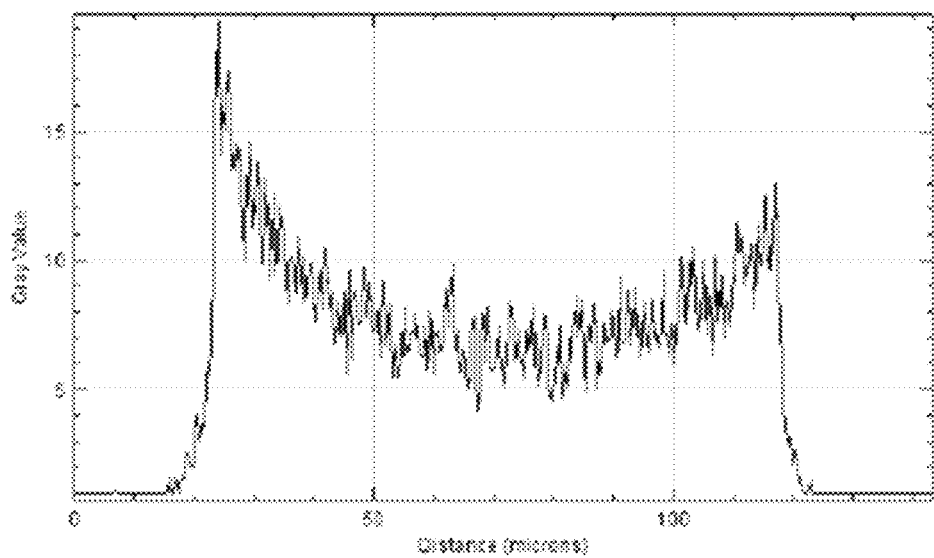
FIG. 3B shows the results of confocal microscope line scans of the cross-section along the line shown in FIG. 3A.
Figure 4A:
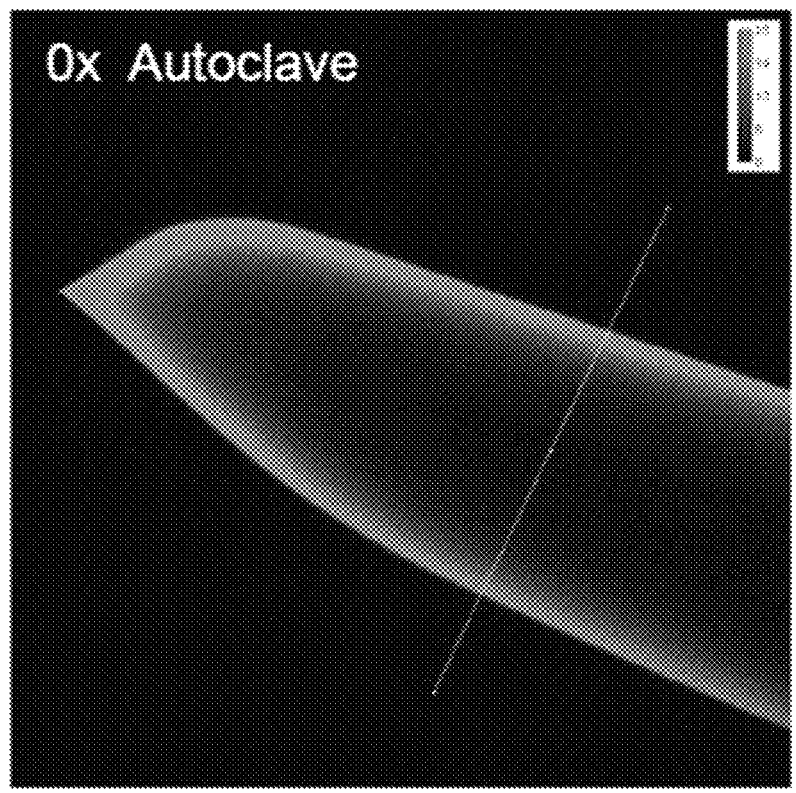
FIG. 4A shows the Fluorescent image of a cross-section of a SiHy lens that is packaged in the same package solution as that used in FIG. 3A, but has not been autoclaved.
Figure 4B:
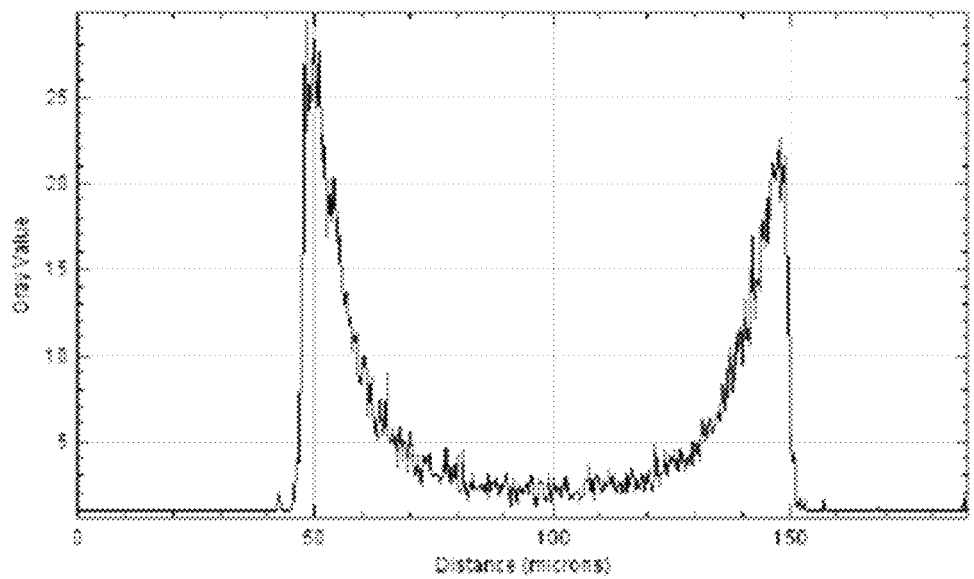
FIG. 4B shows the results of confocal microscope line scans of the cross-section along the line shown in FIG. 4A.

Readily-usable SiHy contact lenses and control lenses are orthogonally cut into cross sections and imaged using Nikon fluorescence microscope. 488 nm laser is chosen to excite the NBD-EO$_{45}$BO$_{10}$. 63× magnification is used for this experiment and the scale bar is 50 µm. The fluorescene images of lens cross sections of readily-usable SiHy contact lenses show that NBD-EO$_4$BO$_{10}$ is adsorbed on the lens surface and penetrates deeply into the bulk material of the readily-usable SiHy contact Ineses (FIG. 3A). In contrast, the fluorescence images of lens cross sections of control contact lenses NBD-EO$_{45}$BO$_{10}$ show that NBD-EO$_{45}$BO$_{10}$ is mostly adsorbed on the lens surface and penetrates into the bulk material in surface region of contact lenses (FIG. 4A). Confocal microscope line scans (FIGS. 3B and 4B) confirm the visual observations.

These experiments shows that a significant amount of NBD-EO$_{45}$BO$_{10}$ is located on the surface and in the region near the surface and also that the step of autoclaving is important for incorporating a polymeric surfactant deep into the SiHy contact lens.

7 Cycles of Simulated 1-Day-Wearing&Cleaning Extraction 7 cycles of simulated 1-day-wearing&cleaning extraction (S1DWC extraction) are carried as follows. In the first cycle, each lens is taken out of the sealed package, blotted and then soaked in 1 mL of fresh PBS in a vial which is kept with shaking in the water bath at 35° C. for 8 hours; and after 8 hours of soaking, the lens is gently blotted and soaked in 2 mL of fresh Opti-Free replenish (OFR) solution in a vial for 16 hours at room temperature. In the second cycle, the lens is taken out of the OFR solution used in the 1$^{st}$ cycle, gently blotted again and soaking in 1 mL of fresh PBS in a vial which is kept with shaking in the water bath at 35° C. for 8 h; and after 8 h soaking, the lens is gently blotted and soaked in 2 mL of fresh OFR solution in a vial for 16 h at room temperature. In the 3$^{rd}$-6$^{th}$ cycles, the extraction is carried out like the 2nd cycle. In the 7$^{th}$ cycle, the lens is taken out of the OFR solution used in the 6$^{th}$ cycle, gently blotted again and soaking in 1 mL of fresh PBS in a vial which is kept with shaking in the water bath at 35° C. for 8 hours. There is no soaking in OFR solution for the 7$^{th}$ cycle.

All the PBS and OFR solutions after soaking are kept in freezer until the HPLC injection.

It should point out that the step of soaking one SiHy contact lens in 1 mL of fresh PBS at 35° C. for 8 hours is intended to simulate the normal daily wearing of a contact lens on an eye by a patient (about 8 hours) while the step of soaking one SiHy contact lens in 2 mL of OFR is intended to simulate a patient's routine practice according to the normal lens care regimes.

The post-autocalve lenses with NBD-EO$_{45}$BO$_{10}$ are butterfly cut and imaged using Nikon conventional microscope at time 0 and after 7 cycles of simulated 1-day-wearing and cleaning extraction. The amount of fluorescence are estimated by integrated using image analysis software ImageJ and results indicate that after 7 days there are still at least about 70% fluorescence remained on the contact lens.

Table 4 shows the results of release of NBD-EO$_{45}$BO$_{10}$ into each of extraction media as determined by HPLC method as described above.

TABLE 4

| | Amount of NBD-EO$_{45}$BO$_{10}$ released per lens (µg) | | | | | |
|---|---|---|---|---|---|---|
| | Lens 1 | | Lens 2 | | Lens 3 | |
| | in PBS | in OFR | in PBS | in OFR | in PBS | in OFR |
| 1$^{st}$ Cycle | 5.3 | 1.9 | 3.4 | 2.0 | 4.9 | 2.0 |
| 2$^{nd}$ Cycle | 4.6 | 1.2 | 4.7 | 1.3 | 5.2 | 1.2 |
| 3$^{rd}$ Cycle | 4.5 | 1.4 | 3.8 | 1.4 | 4.5 | 1.4 |
| 4$^{th}$ Cycle | 3.6 | 1.7 | 4.3 | 1.3 | 3.2 | 0.9 |
| 5$^{th}$ Cycle | 4.1 | 1.1 | 3.8 | 1.2 | 4.5 | 1.1 |
| 6$^{th}$ Cycle | 3.9 | 1.0 | 4.0 | 0.9 | 3.9 | 0.8 |
| 7$^{th}$ Cycle | 3.1 | | 3.1 | | 3.9 | |
| Total Release | 29.1 | 8.2 | 27.1 | 8.0 | 30.1 | 7.4 |
| | 37.3 | | 35.1 | | 37.5 | |

The results in Table 4 shows that a readily-usable SiHy contact lens of this example can release at least 3.1 µg/lens/8 hours of NBD-EO$_{45}$BO$_{10}$, namely 0.00646 µg/lens/minute. With a normal average tear volume of 6.2±2.0 µL (S. Mishima et al., Invest. Ophthalmol. Vis. Sci. 1966, 5: 264-276), the above release rate of the polymeric surfactant would produce a polymeric surfactant concentration of 0.00646 µg·minute$^{-1}$/6.2 µL=1.04 µg/mL in tear on eye.

Example 5

This example illustrates 7 cycles of simulated 1-day-wearing extraction.

Preparation of Packaging Solution

A packaging solution is prepared by dissolving the purified EO$_{45}$BO$_{10}$ which is prepared above in Example 3 and has a PEO-PBO block copolymer of formula (S2) in which R is methyl, m has an average value of 45; and n has an average value of 10, Copolymer 845 (M$_w$~700,000-1,200,000 g/mol by GPC relative to polyethylene oxide standards, M$_w$/M$_n$~5.7-8.5) from ISP, and other required components in water to have the following composition: 150 ppm EO$_{45}$BO$_{10}$, 1% by weight of copolymer 845, 0.77% by weight of NaCl, 0.076% by weight of NaH$_2$PO$_4$.H$_2$O, and 0.47% by weight of Na$_2$HPO$_4$.7H$_2$O.

Lens Packaging

SiHy contact lenses prepared in Example 2 are individually packaged and sealed in PP blister packages each containing 0.65 mL of the packaging solution prepared above. The sealed lens packages are autoclaved at about 121° C. for about 45 minutes.

The amount of $EO_{45}BO_{10}$ uptaken by the readily-usable SiHy contact lens is calculated by $(C_{before\ autoclave} - C_{after\ autoclave}) * 0.65$ mL. $C_{before\ autoclave}$ is the concentration of $EO_4BO_{10}$ in the pre-autoclave packaging solution and is determined to be 150 ppm; $C_{after\ autoclave}$ is the concentration of $EO_{45}BO_{10}$ in the post-autoclave packaging solution and is determined to be 84-91 ppm; and the amount of $EO_{45}BO_{10}$ uptaken by the readily-usable SiHy lens is calculated to be 38-43 µg/lens.

UPLC Method

UPLC analysis is conducted on Waters H-Class system equipped with ELSD (Evaporative light scattering detector) and PDA (photodiode array detector) with column heater or equivalent. The Column is 5 µm C-4 300 Å; 50 mm×4.6 mm (e.g., Phenomenex Jupiter or equivalent) and the Software is Empower 3. The ELSD detector is for $EO_{45}BO_{10}$ detection at the following settings: Gas (50 psi); Nebulizer (Mode—Heating). The PDA detector is for Copolymer 845 detection at UV wavelengths of 227 nm. The injection volume is 250.0 µL. The Sample Compartment Temperature is set at 25° C. The column conditions are: Column Temperature: 60° C.; Pressure: ~2000 PSI. Mobile Phase A is 0.5 M ammonium formate; mobile phase B is 0.04% TFA (trifluoric acid)/methanol. The run time is 30 minutes.

The system's suitability is confirmed by calculating the peak area % RSD (Relative standard deviation) of the first 5 target concentration of 1.0% Co-845 and 150 ppm $EO_{45}BO_{10}$ injections. The % RSDs of each analyte are all less than 1.0%, which is below the maximum validation specification of 10%. The peaks positon are also within specification of 1 minute retention time variation.

Samples for UPLC analysis are prepared as follows. For analysis of each extraction medium used in each of the 7 cycles, the solvent (water) is evaporated and the substances including the polymeric surfactant ($EO_{45}BO_{10}$) are re-dissolved in 500 µL of UPW for UPLC analysis.

A person skilled in the art will understand that by using a smaller volume (e.g., 0.25 mL) of UPW in the UPLC sample preparation, one can increase the concentration of the polymeric surfactant and thereby the analysis accuracy.

For analysis of each extraction medium used in each of the 7 cycles, the solvent (PBS or OFR) is directly injected for UPLC analysis.

7 Cycles of 24-Hour Aqueous Extraction

Seven cycles of 24 hour aqueous extraction of SiHy contact lenses after the sealed and autoclaved lens packages being stored at room temperature for about 12 months are carried as follows. In the 1$^{st}$ cycle, each of 10 lenses is taken out of the sealed package and blotted; and the 10 blotted lenses are then soaked together in 2 mL of fresh PBS (or water only for comparison in this example) in one vial which is kept with shaking in the water bath at 35° C. for 24 h. In the 2$^{nd}$ cycle, all the PBS (or water) used in the 1$^{st}$ cycle is pipetted out of the vial and saved for later UPLC analysis; 2 mL of fresh PBS (or water) is added into the vial which in turn is kept with shaking in the water bath for soaking the 10 lenses at 35° C. for 24 h. In the 3$^{rd}$-7$^{th}$ cycles, the extraction is carried out like the 2nd cycle. All the extraction media (PBS or water) after soaking are kept in freezer until the UPLC analysis.

The amount ($W_{released}$) of $EO_{45}BO_{10}$ released per readily-usable SiHy lens is calculated by the following equation $$W_{release}(\mu g/\text{lens}/24\text{ hours}) = C_{UPLC}\left(\frac{\mu g}{mL}\right) \cdot V_{UPLC}(mL)/N_{lens}$$

in which $C_{UPLC}$ is the concentration of $EO_{45}BO_{10}$ in the injected UPLC sample prepared from each extraction medium used in each of the 7 cycles, $V_{UPLC}$ is the volume of UPW or PBS (0.5 mL for UPW and 1.0 mL for PBS) used in preparing the UPLC sample, and $N_{lens}$ is the number (10) of lenses used in the 7 cycles of 24-hour aqueous extraction. The amounts of $EO_{45}BO_{10}$ and Copolymer-845 (Co-845) released per lens over 24 hours are reported in Table 5.

TABLE 5

| Cycle # | Release in H$_2$O (µg/Lens) | | Release in PBS (µg/lens) | |
| --- | --- | --- | --- | --- |
| | $EO_{45}BO_{10}$ | Co-845 | $EO_{45}BO_{10}$ | Co-845 |
| 1 | 1.3 | 0 | 1.6 | 0 |
| 2 | 1.0 | 0 | 1.1 | 0 |
| 3 | 0.7 | 0 | 1.0 | 0 |
| 4 | 0.8 | 0 | 1.0 | 0 |
| 5 | 0.6 | 0 | 0.8 | 0 |
| 6 | 0.6 | 0 | 0.8 | 0 |
| 7 | NM | NM | 0.8 | 0 |
| Total Release | 5.0 | 0 | 7.2 | 0 |

* NM = not measured

For 10 lenses released into 2 mL PBS, after 7 cycles of 24-hour aqueous extraction, there are about 35.8-38 µg $EO_{45}BO_{10}$ remaining in each lens.

It is found that no detectable amount of Copolymer-845 can be released by the readily-usable SiHy contact lenses, indicating that Copolymer-845 cannot penetrate into the SiHy lenses during autoclave and probably could not bind onto the surface in an amount sufficient for being released in the extraction medium in the 1st cycle.

It is also found that readily-usable SiHy lenses can release $EO_{45}BO_{10}$ in PBS more than in water at 35° C. PBS is chosen as the extraction media to be used in 7 cycles of simulated 1-day-wearing (S1DW) extraction later.

It is further found that the amount of $EO_{45}BO_{10}$ released in the 1st cycle's extraction medium is significantly higher than in the other cycles' extraction media, indicating the release of the polymeric surfactant located on the surface and the region just beneath the surface into the 1$^{st}$ cycle's extraction medium.

7 Cycles of Simulated 1-Day-Wearing Extraction

In this example, seven cycles of S1DW extraction of SiHy contact lenses after the sealed and autoclaved lens packages being stored at room temperature for about 12 months are carried according to the procedures described in Example 1, except that one lens is used and all the PBSs as extraction media after each cycle of S1DW extraction are kept in freezer until the UPLC analysis. The sealed lens packages are The amount ($W_{released}$) of $EO_{45}BO_{10}$ released per readily-usable SiHy lens is calculated by the following equation $$W_{released}(\mu g/\text{lens}/24\text{ hours}) = \frac{C_{UPLC}\left(\frac{\mu g}{mL}\right) \cdot V_{UPLC}(mL)}{N_{lens}}$$

in which $C_{UPLC}$ is the concentration of $EO_{45}BO_{10}$ in the injected UPLC sample prepared from each extraction medium used in each of the 7 cycles, $V_{UPLC}$ is the volume (1.0 mL) of PBS used in preparing the UPLC sample, and $N_{lens}$ is the number (1) of lenses used in the 7 cycles of S1DW extraction in this Example. The amounts of $EO_{45}BO_{10}$ and Copolymer-845 (Co-845) released per lens over 24 hours are reported in Table 6.

TABLE 6

| Cycle # | Release in PBS (µg/Lens/24 hours) | |
|---|---|---|
| | $EO_{45}BO_{10}$ | Co-845 |
| 1 | 3.9 | 0 |
| 2 | 2.4 | 0 |
| 3 | 2.7 | 0 |
| 4 | 2.3 | 0 |
| 5 | 1.4 | 0 |
| 6 | 1.3 | 0 |
| 7 | 1.2 | 0 |
| Total Release | 15.2 | 0 |

Table 7 shows that after 7 cycles of S1DW extraction, there is about 27.8 µg $EO_{45}BO_{10}$ remaining in each lens, that no detectable amount of Copolymer-845 can be released by the readily-usable SiHy contact lenses, indicating that Copolymer-845 cannot penetrate into the SiHy lenses during autoclave and probably could not bind onto the surface in an amount sufficient for being released in the extraction medium in the $1^{st}$ cycle, and that the amount of $EO_{45}BO_{10}$ released in the 1st cycle's extraction medium is significantly higher than in the other cycles' extraction media, indicating the release of the polymeric surfactant located on the surface and the region just beneath the surface into the $1^{st}$ cycle's extraction medium.

Example 6

Preparation of Packaging Solutions

Five packaging solutions are prepared by dissolving the purified $EO_{45}BO_{10}$ which is prepared above in Example 3 and has a PEO-PBO block copolymer of formula (S2) in which R is methyl, m has an average value of 45; and n has an average value of 10, Copolymer 845 ($M_w$~700,000-1,200,000 g/mol by GPC relative to polyethylene oxide standards, $M_w/M_n$~5.7-8.5) from ISP, and other required components in water to have the following composition: one of the five different concentrations (50 ppm, 100 ppm, 150 ppm, 250 ppm and 400 ppm) of $EO_{45}BO_{10}$, 1% by weight of copolymer 845, 0.77% by weight of NaCl, 0.076% by weight of $NaH_2PO_4$—$H_2O$, and 0.47% by weight of $Na_2HPO_4$-$7H_2O$.

Lens Packaging

Two types of SiHy lenses: SiHy contact lenses prepared according to procedures described in Example 2 and plasma-treated SiHy contact lenses which have an equilibrium water content (EWC) of about 33% by weight and are produced according to the procedures described in Example 3 of U.S. Pat. No. 9,829,723, are individually packaged and sealed in PP blister packages each containing 0.65 mL of one of the five packaging solutions prepared above. The sealed lens packages are autoclaved at about 121° C. for about 45 minutes. The resultant lenses autoclaved in the sealed lens packages are subjected to studies and characterization below. The sealed and autoclaved lens packages are stored at room temperature less than 3 weeks before the tests described below.

7 Cycles of Simulated 1-Day-Wearing Extraction

Seven cycles of S1DW extraction of the freshly prepared SiHy contact lenses (storage time at room temperature is less than about 3 weeks) are carried out according to the procedures described in Example 5. Like Example 5, one lens is used in the 7 cycles of S1DW extraction in this example.

Changes in Lens Diameter after 7 Cycles of S1DW Extraction

The lens diameters are determined according to the procedures described in Example 1. Control lenses, which are SiHy contact lenses prepared according to the procedures described in Example 2 and are individually sealed and autoclaved in PBS in PP blister packages each containing 0.65 mL of PBS, are determined to have an average lens diameter ($DIA_{control}$) of 14.04±0.02 mm. Testing SiHy contact lenses, which are prepared according to the procedures described in Example 2 and are sealed and autoclaved in one of the five packaging solutions prepared above in lens packages, are determined to have values (reported in Table 7) of lens diameter directly out of packages ($DIA_{OOP}$) and lens diameter after 7 cycles of S1DW extraction ($DIA_{7\ S1DW\ extraction}$).

TABLE 7

| | [$EO_{45}BO_{10}$] (ppm) in packging solution | | | | |
|---|---|---|---|---|---|
| | 50 | 100 | 150 | 250 | 400 |
| $DIA_{OOP}$ (mm) | 14.14 ± 0.02 | 14.14 ± 0.03 | 14.15 ± 0.02 | 14.18 ± 0.01 | 14.23 ± 0.02 |
| $\Delta DIA_{uptake}$ (mm)* | 0.10 | 0.10 | 0.11 | 0.14 | 0.19 |
| $DIA_{7\ S1DW\ extraction}$ (Mm) | 14.05 ± 0.01 | 14.06 ± 0.01 | 14.07 ± 0.01 | 14.09 ± 0.02 | 14.12 ± 0.01 |
| $\Delta DIA_{release}$ (mm)* | 0.09 | 0.08 | 0.08 | 0.09 | 0.11 |

*$\Delta DIA_{uptake}$ = $DIA_{OOP}$-$DIA_{control}$;
$\Delta DIA_{release}$ = $DIA_{7\ S1DW\ extraction}$-$DIA_{OOP}$ The results show that the lens diameters of SiHy contact lenses, which have a EWC of about 54% by weight and are free of any coating before being autoclaved in a packaging solution including $EO_{45}BO_{10}$, can be increased after autoclave, indicating that $EO_{45}BO_{10}$ can penetrate into the SiHy contact lenses and distributed in their polymer matrix during autoclave in a packaging solution including $EO_{45}BO_{10}$.

The results also show that lens diameter of a readily-usable SiHy contact lens of the invention can be decreased after 7 cycles of S1DW extraction (i.e., approximately corresponding to 7 days of continuous wearing), indicating that the $EO_{45}BO_{10}$ is untaken significantly and distributed in the polymer matrix of the readily-usable SiHy contact lens of the invention and it can be released into tears when the lens being worn on eye.

Example 7

Preparations of Packaging Solutions

Copolymer 845 ($M_w$~700,000-1,200,000 g/mol by GPC relative to polyethylene oxide standards, $M_w/M_n$~5.7-8.5) is obtained from ISP. A polymeric surfactant, copolymer $EO_{45}BO_{10}$ which has a PEO-PBO block copolymer of formula (S2) in which R is methyl, m has an average value of 45; and n has an average value of 10, is prepared according to the procedures described in U.S. Pat. No. 8,318,144.

Four packaging solutions (Packaging Solutions I to IV) are prepared by dissolving various components in water as shown in Table 2 according to the procedures described in Example 3.

Lens Packaging

SiHy contact lenses prepared in Example 2 are individually packaged and sealed in PP blister packages each containing 0.65 mL of Packaging solution III or IV (prepared above) or in vials each containing about 2 mL of Packaging solution I or II (prepared above). The sealed lens packages are autoclaved at about 121° C. for about 45 minutes. The sealed and autoclaved lens packages are stored at room temperature for less than 3 weeks before the tests described below.

7 Cycles of Simulated 1-Day-Wearing Extraction

Seven cycles of S1DW extraction of the freshly prepared SiHy contact lenses (storage time at room temperature is less than about 3 weeks) are carried out according to the procedures described in Example 5. Like Example 5, one lens is used in the 7 cycles of S1DW extraction in this example.

Wettabilities of Readily-Usable SiHy Contact Lenses

The static water contact angles ($WCA_{OOP}$) of readily-usable SiHy contact lenses directly out of the packages and the static water contact angles ($WCA_{7\_S1DW}$) of readily-usable SiHy contact lenses after 7 cycles of S1DW extraction are determined according to the procedures described in Example 1. The results are reported in Table 8.

TABLE 8

| | Packaging Solution No. | | | |
|---|---|---|---|---|
| | I (Control) | II | III | IV |
| $WCA_{OOP}$ (degrees) | 82 ± 3 | 70 ± 2 | 66 ± 4 | 51 ± 2 |
| $WCA_{7\_S1DW\ extraction}$ (degrees) | 87 ± 1 | 86 ± 1 | 81 ± 2 | 72 ± 1 |

All the publications, patents, and patent application publications, which have been cited herein above in this application, are hereby incorporated by reference in their entireties.

What is claimed is:

1. An ophthalmic product, comprising a sealed and autoclave-sterilized package which include a post-autoclave packaging solution and a readily-usable silicone hydrogel contact lens immersed therein, wherein the post-autoclave packaging solution is a buffered saline having a pH of from about 6.0 to about 8.0 and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons, wherein the readily-usable silicone hydrogel contact lens is obtained by placing, sealing and autoclaving a pre-formed silicone hydrogel contact lens in a pre-autoclave packaging solution including the polymeric surfactant in a package, wherein the pre-formed silicone hydrogel contact lens is free of any coating thereon, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 μg/lens/24 hours as measured in an aqueous extraction process consisting of 7 cycles of simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction, wherein the readily-usable silicone hydrogel contact lens further has a first static water contact angle, $WCA_{OOP}$, of about 75° or less as measured directly out of the sealed package by sessile drop method, a second static water contact angle, $WCA_{7\_S1DW}$, of about 85° or less as measured by sessile drop method immediately after being subjected to the 7 cycles of the simulated 1-day-wearing extraction, an oxygen permeability of at least 50 barrers, an elastic modulus of from about 0.2 MPa to about 1.5 MPa, and an equilibrium water content of from about 38% to about 80% by weight.

2. The ophthalmic product of claim 1, wherein the readily-usable silicone hydrogel contact lens has a capability of releasing the polymeric surfactant in an amount of at least 0.4 μg/lens/24 hours as measured in the aqueous extraction process consisting of the 7 cycles of the simulated 1-day-wearing extraction.

3. The ophthalmic product of claim 1, wherein the polymeric surfactant is a di-block copolymer designated as PEO-PBO or a tri-block copolymer designated as PEO-PBO-PEO or PBO-PEO-PBO, in which PEO represents poly(oxyethylene) segment and PBO represents poly(oxybutylene) segment.

4. The ophthalmic product of claim 1, wherein the polymeric surfactant is a di-block copolymer of formula (S1)

RO—(EO)$_m$(BO)$_n$—H      (S1)

wherein: R is selected from the group consisting of hydrogen, methyl, ethyl, propyl and butyl; EO is ethyleneoxide —$C_2H_4O$—; BO is butyleneoxide —$C_4H_8O$—; m is an integer having an average value of 10 to 250; and n is an integer having an average value of 5 to 125, provided that the value of m/n is from about 2:1 to about 10:1.

5. The ophthalmic product of claim 1, wherein the polymeric surfactant is a di-block copolymer of formula (S2)

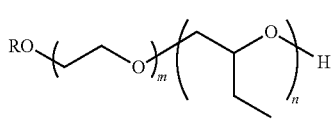 (S2)

wherein R is selected from the group consisting of hydrogen, methyl, ethyl, propyl and butyl; m is an integer having an average value of 10 to 250; and n is an integer having an average value of 5 to 125, provided that the value of m/n is from about 2:1 to about 10:1.

6. The ophthalmic product of claim 5, wherein the readily-usable silicone hydrogel contact lens comprises at least about 40 μg/lens of the polymeric surfactant.

7. The ophthalmic product of claim 5, wherein the pre-autoclave packaging solution further comprises from about 0.1% to about 2% by weight of a hydrophilic polymer having a number average molecular weight of at least 100,000 Daltons.

8. The ophthalmic product of claim 1, wherein the pre-autoclave packaging solution further comprises from about 0.1% to about 2% by weight of a hydrophilic polymer having a number average molecular weight of at least 100,000 Daltons.

9. The ophthalmic product of claim 8, wherein the hydrophilic polymer is a polyvinylpyrrolidone or a copolymer of N-vinylpyrrolidone and at least one amino-containing vinylic monomer, wherein the amino-containing vinylic monomer is selected from the group consisting of alkylaminoalkylmethacrylate having 8-15 carbon atoms, alkylaminoalkylacrylate having 7-15 carbon atoms, dialkylaminoalkylmethacrylate having 8-20 carbon atoms, dialkylaminoalkylacrylate having 7-20 carbon atoms, and N-vinylalkylamide having 3-10 carbon atoms.

10. The ophthalmic product of claim 9, wherein the pre-formed silicone hydrogel contact lens is an inherently wettable silicone hydrogel contact lens.

11. The ophthalmic product of claim 9, wherein the pre-formed silicone hydrogel contact lens is composed of a silicone hydrogel material comprising (1) repeating units of at least one silicone-containing vinylic monomer and/or repeating units of at least one polysiloxane vinylic crosslinker, and (2) repeating units of at least one hydrophilic vinylic monomer, wherein said at least one silicone-containing vinylic monomer is selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

12. The ophthalmic product of claim 11, wherein the silicone hydrogel material comprises repeating units of at least one polysiloxane vinylic crosslinker, wherein said at least one polysiloxane vinylic crosslinker comprises a vinylic crosslinker of formula (I)

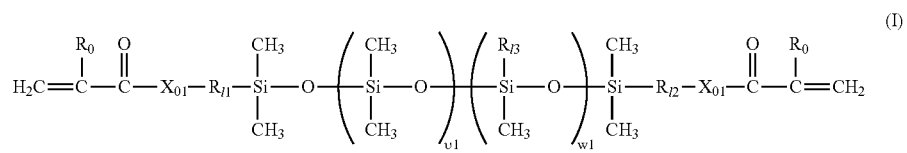 (I)

in which:

υ1 is an integer of from 30 to 500 and ω1 is an integer of from 1 to 75, provided that ω1/υ1 is from about 0.035 to about 0.15;

$X_{01}$ is O or $NR_N$ in which $R_N$ is hydrogen or $C_1$-$C_{10}$-alkyl;

$R_o$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

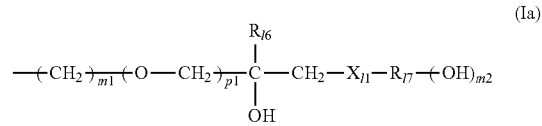 (Ia)

 (Ib)

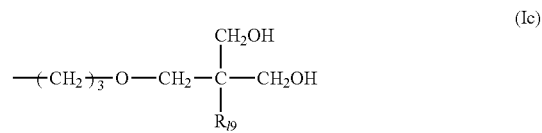 (Ic)

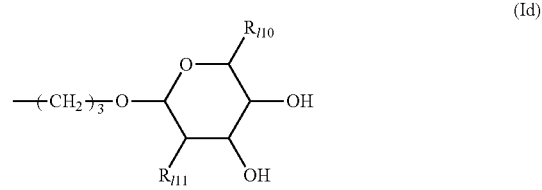 (Id)

-continued

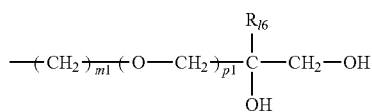
(Ie)

p1 is zero or 1; m1 is an integer of 2 to 4; m2 is an integer of 1 to 5; m3 is an integer of 3 to 6; m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydromethyl;
$R_{I11}$ is hydroxyl or methoxy;
$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and
$X_{I2}$ is an amide linkage of

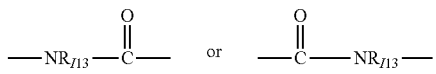

in which $R_{11}3$ is hydrogen or $C_1$-$C_{10}$ alkyl.

13. The ophthalmic product of claim 11, wherein the silicone hydrogel material comprises repeating units of at least one polysiloxane vinylic crosslinker, wherein said at least one polysiloxane vinylic crosslinker comprises a vinylic crosslinker of any one of formula (1) to (7)

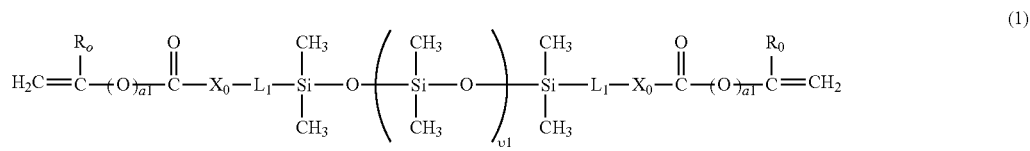
(1)

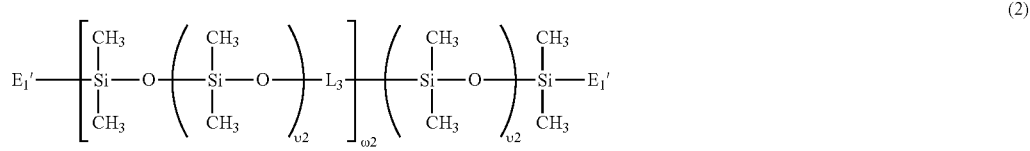
(2)

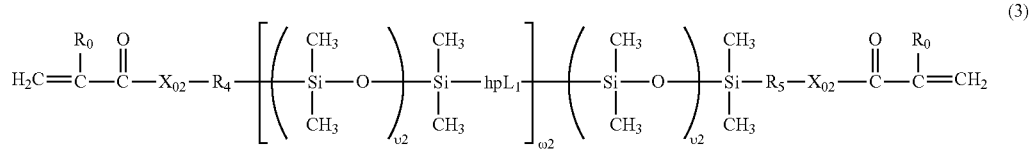
(3)

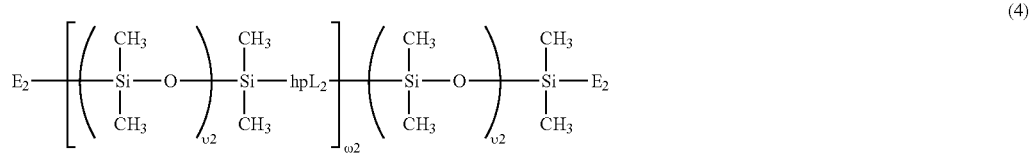
(4)

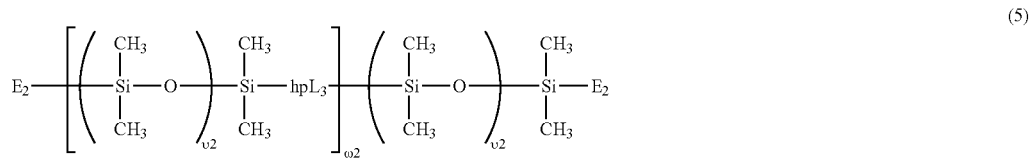
(5)

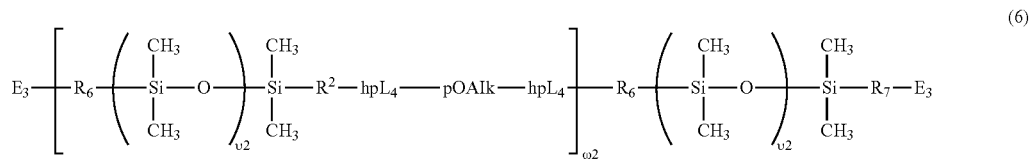
(6)

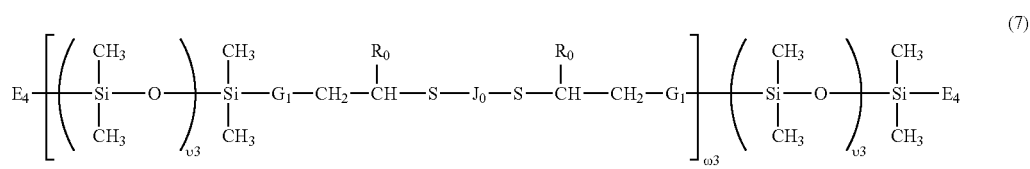
(7)

in which:
- υ1 is an integer of from 30 to 500;
- υ2 is an integer of from 5 to 50;
- υ3 is an integer of from 5 to 100;
- ω2 and ω3 independent of each other are an integer of from 1 to 15;
- a1 and g1 independent of each other is zero or 1;
- h1 is an integer of 1 to 20 and h2 is an integer of 0 to 20;
- m1 and m3 independent of each other is 0 or 1, m2 is an integer of 1 to 6, m4 is an integer of 1 to 5, m5 is 2 or 3;
- q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
- x+y is an integer of from 10 to 30;
- e1 is an integer of 5 to 100, p1 and b1 independent of each other are an integer of 0 to 50, provided that (e1+p1+b1)≥10 and e1/(p1+b1)≥2 when (p1+b1)≥1;
- $R_o$ is H or methyl;
- $R_1$, $R_{1n}$, $R_{2n}$, $R_{3n}$, and $R_{4n}$ independent of one another are H or a $C_1$-$C_4$ alkyl having 0 to 2 hydroxyl group;
- $R_{n5}$ is H or a $C_1$-$C_{10}$ alkyl;
- $R_2$ is a $C_4$-$C_{14}$ hydrocarbon divalent radical;
- $R_3$ is a $C_2$-$C_6$ alkylene divalent radical;
- $R_4$ and $R_5$ independent of each other are a $C_1$-$C_6$ alkylene divalent radical or a $C_1$-$C_6$ alkylene-oxy-$C_1$-$C_6$ alkylene divalent radical;
- $R_6$ and $R_7$ independent of each other are a $C_1$-$C_6$ alkylene divalent radical or a $C_1$-$C_6$ alkoxy-$C_1$-$C_6$ alkylene divalent radical;
- $R_8$ and $R_9$ independent of each other are a substituted or unsubstituted $C_1$-$C_{12}$ alkylene divalent radical;
- $X_o$, $X_1'$, $X_{o1}$, $X_{o2}$, and $X_{o3}$ independent of one another are O or $NR_1$;
- $X_1$ is O, $NR_1$, NHCOO, OCONH, $CONR_1$, or $NR_1CO$;
- $X_{o4}$ is —COO— or —$CONR_{n5}$—;
- $X_{o5}$ and $X_{o7}$ independent of each other are a direct bond, —COO— or —$CONR_{n5}$—;
- $X_{o6}$ is a direct bond, a $C_1$-$C_6$ alkylene divalent radical, a $C_1$-$C_6$ alkylenoxy divalent radical, —COO—, or —$CONR_{n5}$—;
- $X_{o8}$ is a direct bond or —COO—;
- $X_{o9}$ is O or $NR_{n5}$;
- $X_{10}$ is a direct bond, a $C_1$-$C_6$ alkylene divalent radical, —COO—, or —$CONR_{n5}$—;

$E_1'$ is a monovalent radical of

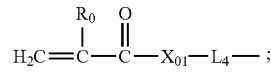

$E_2$ is a monovalent radical of

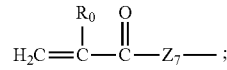

$E_3$ is a monovalent radical of

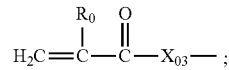

$E_4$ is a monovalent radical of

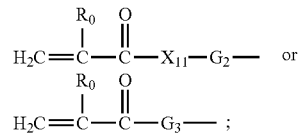

$L_1$ is a $C_2$-$C_8$ alkylene divalent radical or a divalent radical of

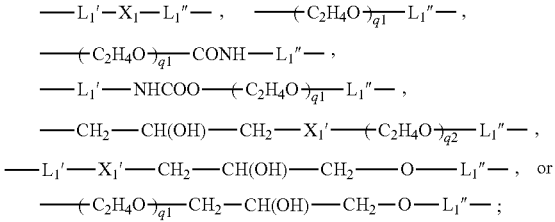

$L_1'$ is a $C_2$-$C_8$ alkylene divalent radical which has zero or one hydroxyl group;
$L_1''$ is $C_3$-$C_8$ alkylene divalent radical which has zero or one hydroxyl group;
$L_3$ is a divalent radical of —$L_3'$—O—$(C_2H_4O)_{\overline{q2}}$—CONH—$R_2$—$(NHCO$—PE—CONH—$R_2)_{\overline{g1}}$—NHCO—$(OC_2H_4)_{\overline{q2}}$—O—$L_3'$— in which PE is a divalent radical of

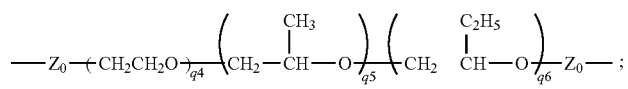

$L_3'$ is $C_3$-$C_6$ alkylene divalent radical;
$L_4$ is a divalent radical of

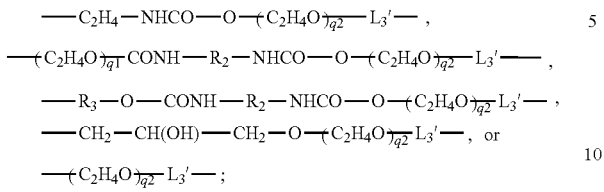

$hpL_1$ is a divalent radical of

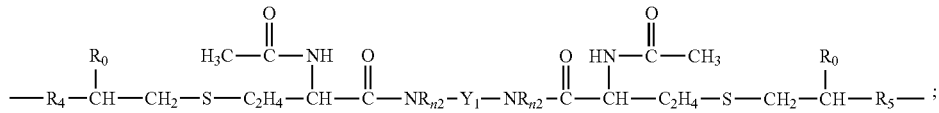

$hpL_2$ is a divalent radical of

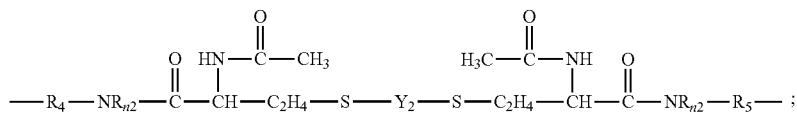

$hpL_3$ is a divalent radical of

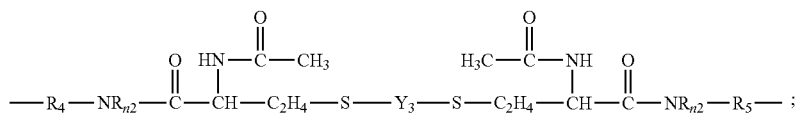

$hpL_4$ is a divalent radical of

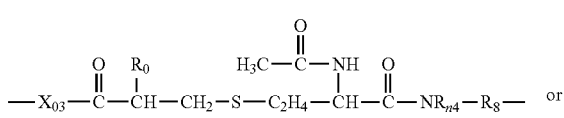 or

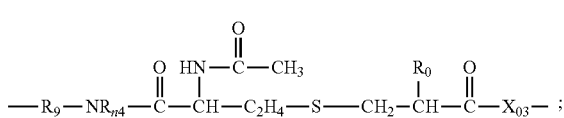

pOAlk is a divalent radical of -$(EO)_{e1}(PO)_{p1}(BO)_{b1}$— in which EO is an oxyethylene unit (—$CH_2CH_2O$—), PO is an oxypropylene unit

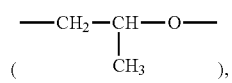

and BO is an oxybutylene unit

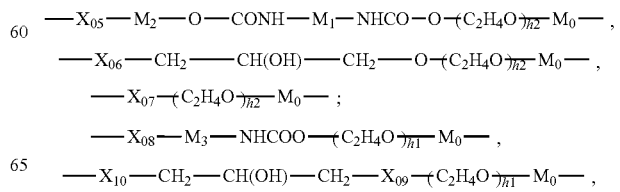

$M_0$ is $C_3$-$C_8$ alkylene divalent radical;
$M_1$ is a $C_4$-$C_{14}$ hydrocarbon divalent radical;
$M_2$ and $M_3$ independent of each other are a $C_1$-$C_6$ alkylene divalent radical;
$J_0$ is a $C_1$-$C_{12}$ hydrocarbon radical having 0 to 2 hydroxyl or carboxyl groups;
G1 is a direct bond, a $C_1$-$C_4$ alkylene divalent radical, or a bivalent radical of —$X_{04}$—$(C_2H_4O)_{\overline{n1}}$—CONH—$M_1$—NHCO—O—$(C_2H_4O)_{\overline{n2}}$—$M_0$—, —$X_{05}$—$M_2$—O—CONH—$M_1$—NHCO—O—$(C_2H_4O)_{\overline{n2}}$—$M_0$—, —$X_{06}$—$CH_2$—CH(OH)—$CH_2$—O—$(C_2H_4O)_{\overline{n2}}$—$M_0$—, —$X_{07}$—$(C_2H_4O)_{\overline{n2}}$—$M_0$—;

—$X_{08}$—$M_3$—NHCOO—$(C_2H_4O)_{\overline{n1}}$—$M_0$—,

—$X_{10}$—$CH_2$—CH(OH)—$CH_2$—$X_{09}$—$(C_2H_4O)_{\overline{n1}}$—$M_0$—,

-continued

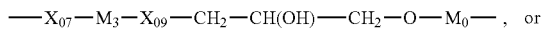, or

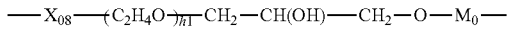

in which $M_o$ is linked to Si atom while $X_{04}$ to $X_{10}$ are linked to the group of —$CH_2$— in formula (7) and at least one of $J_0$ and G1 in formula (7) comprises at least one moieties selected from the group consisting of hydroxyl groups, urethane linkage of —OCONH—, amino groups of —$NHR^o$, amino linkages of —NH—, amide linkages of —CONH—, carboxyl groups, and combinations thereof;

$G_2$ is a $C_1$-$C_4$ alkylene divalent radical or a bivalent radical of

,
,
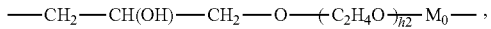,
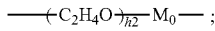;
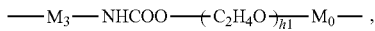,
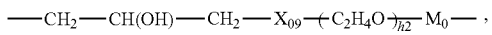,
, or
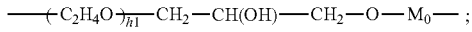;

$G_3$ is a divalent radical of

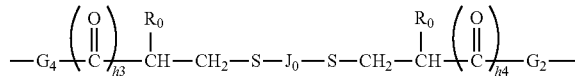

in which h3 and h4 independent of each other are 1 or 0;

G4 is a divalent radical of any one of (a) —$NR_3'$— in which $R_3'$ is hydrogen or $C_1$-$C_3$ alkyl, (b)

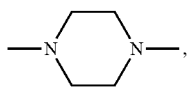, (c) —$NR_0$-$G_5$-$NR_0$— in which $G_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-$G_6$-O— in which $G_6$ is a $C_1$-$C_6$ alkylene divalent radical, a divalent radical of

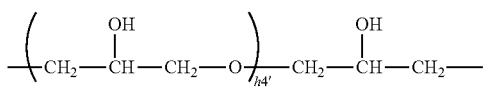

in which h4' is 1 or 2, a divalent radical of

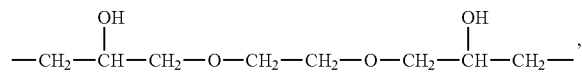, a divalent radical of

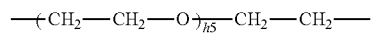

in which h5 is an integer of 1 to 5, a divalent radical of

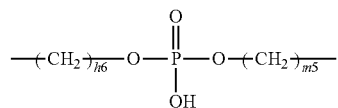

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

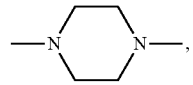, or a divalent radical of

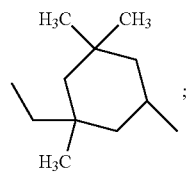;

$Y_2$ is a divalent radical of

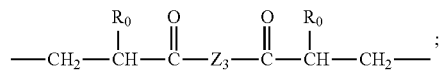;

$Y_3$ is a divalent radical of

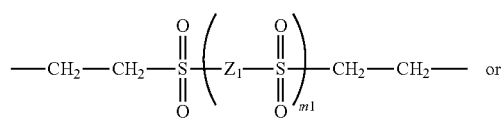 or

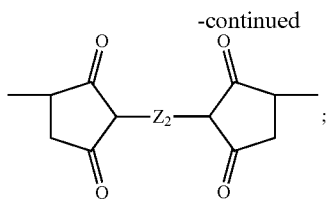

- $Z_0$ is a direct bond or a $C_1$-$C_{12}$ alkylene divalent radical;
- $Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
- $Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical,
- $Z_3$ is a divalent radical of any one of (a) —$NR_{n3}$—, (b)

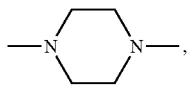

(c) —$NR_0$—$Z_5$—$NR_0$—, and (d) —O—$Z_6$—O—,
- $Z_4$ is a $C_1$-$C_6$ alkylene divalent radical,
- $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical,
- $Z_6$ is (a) a $C_1$-$C_6$ alkylene divalent radical, (b) a divalent radical of

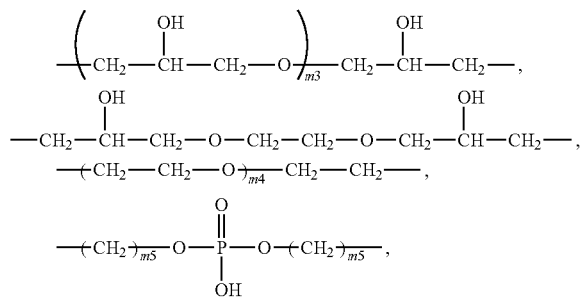

or (c) a substituted $C_3$-$C_8$ alkylene divalent radical having a hydroxyl group or phosphonyloxy group,
- $Z_7$ is a divalent radical of

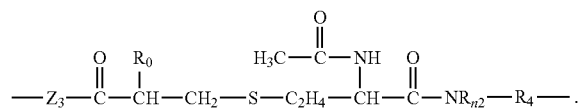

14. The ophthalmic product of claim 11, wherein the silicone hydrogel material comprises repeating units of at least one polysiloxane vinylic crosslinker, wherein said at least one polysiloxane vinylic crosslinker is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

15. The ophthalmic product of claim 11, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'(trimethylammonio)ethylphosphate, 2-((meth)acryloyloxy) hexyl-2'-(trimethylammonio)ethyl phosphate, 2-(vinyloxy)ethyl-2'-(trimethylammonio)ethylphosphate, 2-(allyloxy) ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

16. The ophthalmic product of claim 11, wherein the silicone hydrogel material comprises (a) repeating units of at least one non-silicone vinylic cross-linking agent, (b) repeating units of at least one blending vinylic monomer, and/or (c) repeating units of at least one UV-absorbing vinylic monomer and/or at least one UV/HEVL-Absorbing vinylic monomer.

17. The ophthalmic product of claim 16, wherein the pre-formed silicone hydrogel contact lens is an inherently wettable silicone hydrogel contact lens.

18. The ophthalmic product of claim 12, wherein the pre-formed silicone hydrogel contact lens is an inherently wettable silicone hydrogel contact lens.

19. The ophthalmic product of claim 13, wherein the pre-formed silicone hydrogel contact lens is an inherently wettable silicone hydrogel contact lens.

20. The ophthalmic product of claim 10, wherein the static water contact angle of the readily-usable silicone hydrogel contact lens directly out of the sealed and autoclave-sterilized package is at least 10 degrees lower than the static water contact angle of the pre-formed silicone hydrogel contact lens.

21. The ophthalmic product of claim 10, wherein the polymeric surfactant is present in the pre-autoclave packaging solution in an amount selected to ensure that difference in lens diameter between the readily-usable SiHy contact lens and control lens that is the preformed SiHy contact lens autoclaved in phosphate buffered saline free of the polymeric surfactant is less than about 0.20 mm.

22. The ophthalmic product of claim 10, wherein the pre-autoclave packaging solution comprises from about 0.005% to about 0.038% by weight of the polymeric surfactant.

23. A method for producing ophthalmic products, comprising the steps of:
a) placing and sealing a pre-formed silicone hydrogel contact lens in a container containing a pre-autoclave packaging solution, wherein the pre-formed silicone hydrogel contact lens is free of any coating and has an oxygen permeability of at least 50 barrers, an elastic modulus of from about 0.2 MPa to about 1.5 MPa, and an equilibrium water content of from about 38% to about 80% by weight, wherein the pre-autoclave packaging solution is a buffered saline having a pH of from about 6.0 to about 8.0 and includes a polymeric surfactant which comprises at least one hydrophilic poly(oxyethylene) segment and at least one hydrophobic poly(oxybutylene) segment and has an HLB value of from about 11 to about 16 and a number average molecular weight of from about 800 to about 20,000 Daltons; and
b) autoclaving the sealed package containing the pre-formed silicone hydrogel contact lens therein for at least about 30 minutes to obtain an ophthalmic product, wherein the ophthalmic product comprises a readily-usable silicone hydrogel contact lens immersed in a post-autoclave packaging solution in the sealed and autoclaved package, wherein the readily-usable silicone hydrogel contact lens comprises the polymeric surfactant physically distributed in the polymer matrix of the readily-usable silicone hydrogel contact lens as evidenced by having a capability of releasing the polymeric surfactant in an amount of at least 0.2 µg/lens/24 hours as measured in an aqueous extraction process consisting of 7 cycles of simulated 1-day-wearing extraction, a first static water contact angle, $WCA_{OOP}$, of about 75° or less as measured directly out of the sealed package by sessile drop method, and a second static water contact angle, $WCA_{7\_SIDW}$, of about 85° or less as measured by sessile drop method immediately after being subjected to the 7 cycles of the simulated 1-day-wearing extraction, wherein the capacity of releasing the polymeric surfactant is the amount of the polymeric surfactant released per lens over 24 hours into an extraction medium which has been used in the last cycle of the 7 cycles of the simulated 1-day-wearing extraction.

* * * * *